(12) United States Patent
Oishi et al.

(10) Patent No.: US 6,820,275 B2
(45) Date of Patent: Nov. 16, 2004

(54) DISC CARTRIDGE WITH TRANSPARENT WINDOWS

(75) Inventors: Kengo Oishi, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/098,150

(22) Filed: Mar. 15, 2002

(65) Prior Publication Data

US 2002/0131208 A1 Sep. 19, 2002

(30) Foreign Application Priority Data

Mar. 16, 2001 (JP) ......................................... 2001-76948

(51) Int. Cl.[7] .............................................. G11B 23/03
(52) U.S. Cl. ................................................... 720/729
(58) Field of Search ............................... 360/133, 132; 369/291

(56) References Cited

U.S. PATENT DOCUMENTS

| | | | | |
|---|---|---|---|---|
| 4,633,356 A | * | 12/1986 | Takahashi ................. | 360/133 |
| 6,266,211 B1 | * | 7/2001 | Thomas et al. ............ | 360/133 |
| 6,266,319 B1 | * | 7/2001 | Ikebe et al. ................. | 369/291 |
| 6,307,831 B1 | * | 10/2001 | Miyazaki et al. ........... | 369/291 |
| 6,407,982 B1 | * | 6/2002 | Aoki et al. ................. | 369/291 |
| 6,473,392 B2 | * | 10/2002 | Shiomi et al. .............. | 369/291 |

FOREIGN PATENT DOCUMENTS

| | | | |
|---|---|---|---|
| JP | 08161845 A | * | 6/1996 |
| JP | 11-312353 | | 11/1999 |
| JP | 2000-30394 | | 1/2000 |
| JP | 2000-30395 | | 1/2000 |
| JP | 2000-30396 | | 1/2000 |
| JP | 2000-30397 | | 1/2000 |
| JP | 2000-30398 | | 1/2000 |
| JP | 2000-30399 | | 1/2000 |
| JP | 2000-90626 | | 3/2000 |
| JP | 2000-90627 | | 3/2000 |
| JP | 2000-90628 | | 3/2000 |
| JP | 2000311460 A | * | 11/2000 |

* cited by examiner

Primary Examiner—Tianjie Chen
(74) Attorney, Agent, or Firm—Sughrue Mion, PLLC

(57) ABSTRACT

A disc cartridge having a shutter which can open/close an opening for access to a disc-shaped disc medium, which opening is formed in at least one surface of a case which rotatably accommodates the disc medium. A visual recognition means which enables visual recognition of recorded/unrecorded regions is provided at a disc medium recording surface side of the case. A push portion for fingers at a time of loading the disc cartridge into a drive device is provided at a rear surface of the case. An urging means for urging in a closing/opening direction is provided at the shutter which opens/closes the opening. The disc cartridge is provided in which an unrecorded amount of the disc medium can be visually recognized from an exterior, operation of the shutter is smooth, and loading of the disc cartridge into the drive device can be carried out smoothly and stably.

8 Claims, 27 Drawing Sheets

FIG.15
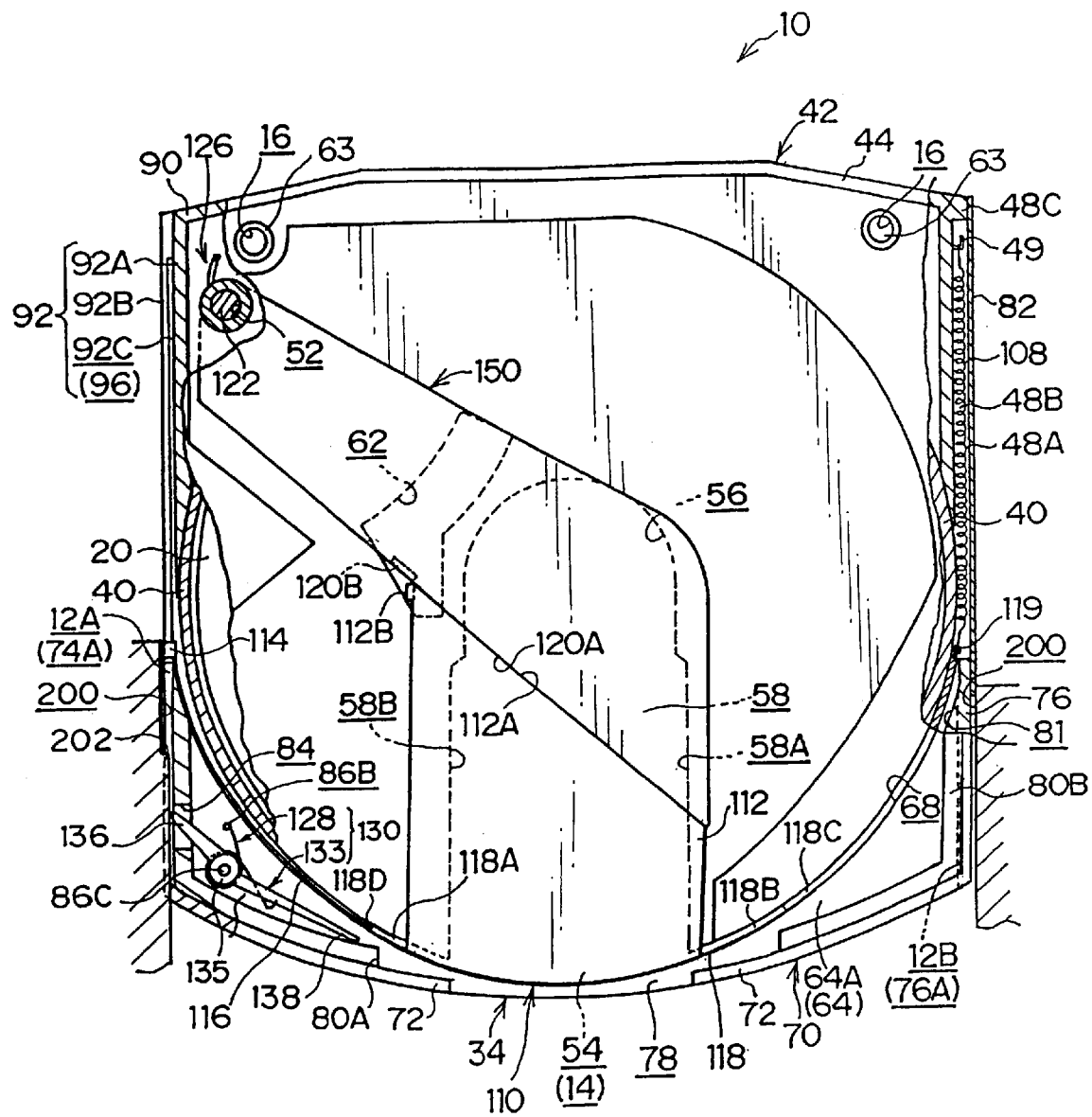
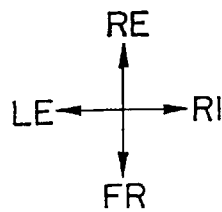

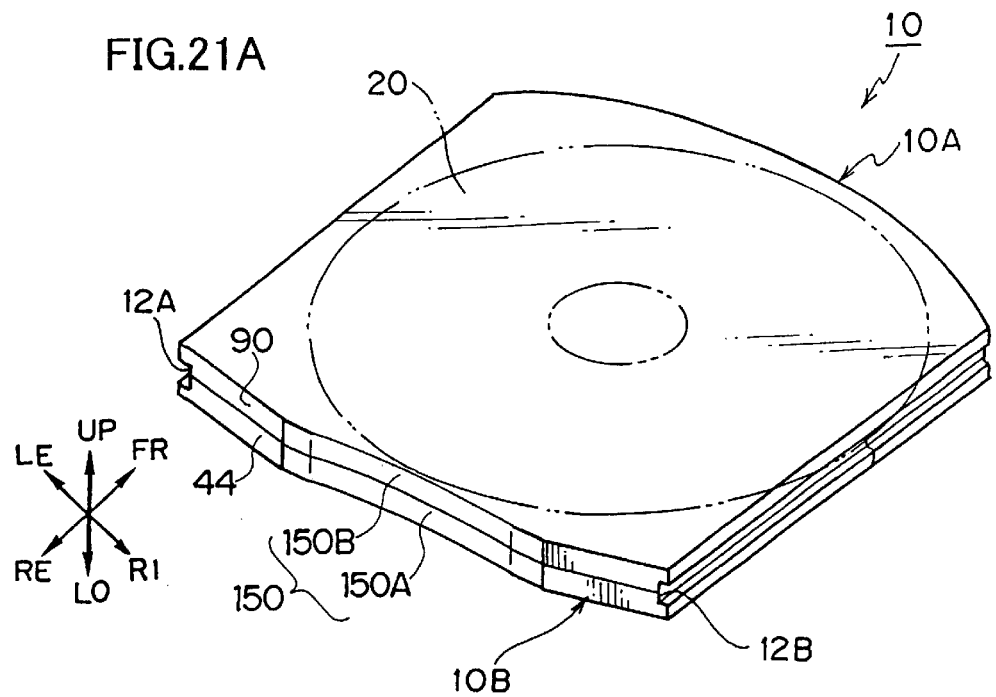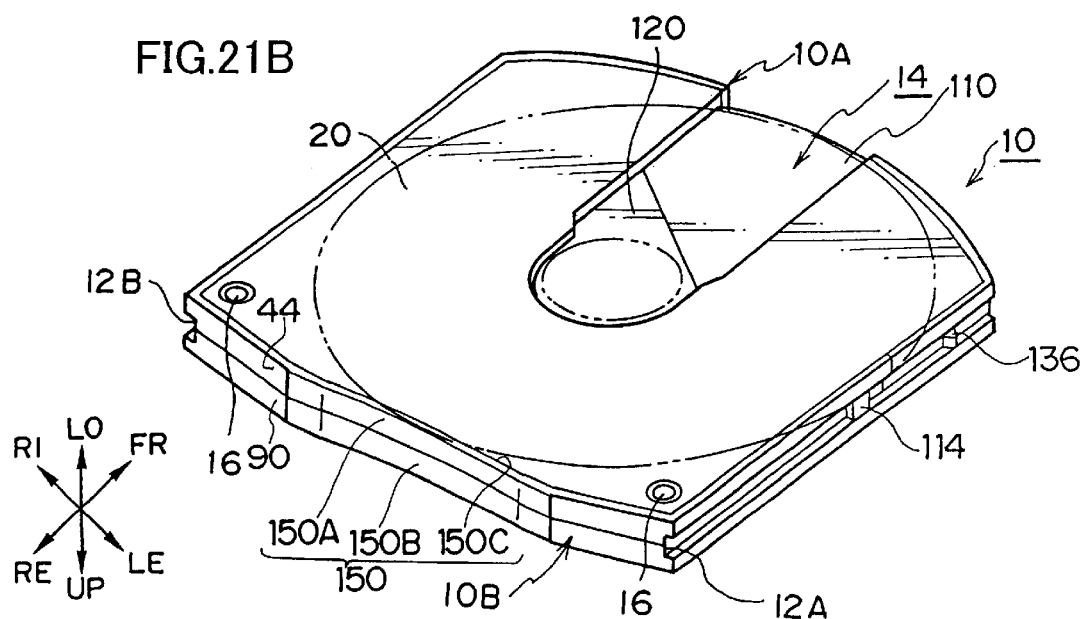

DISC CARTRIDGE WITH TRANSPARENT WINDOWS

BACKGROUND OF THE INVENTION

1. Field of the Invention

The present invention relates to a disc cartridge which rotatably accommodates a disc-shaped disc medium used as a recording/playback medium of an information processing device or the like, and which prevents entry of dust or the like.

2. Description of the Related Art

A disc-shaped disc medium, such as an optical disc, a magneto-optical disc, or the like, is used, for example, as a portable recording/playback medium for a computer. When recording or playback of the disc medium is carried out, laser beam is illuminated onto the recording surface while the disc medium is rotated in a state of being loaded in a drive device. In this way, recording of information is carried out by pit formation or phase changes or magnetization or the like due to decomposition of the dye layers of the recording surface, or recorded information is played back on the basis of differences in the reflectivity or the polarizing angle of the laser beam.

Accordingly, there are disc media in which, when information is recorded on such a disc medium, it can be visually confirmed to what point recording has been carried out. Namely, the regions at which information is recorded/unrecorded can be judged due to the hue of the recording surface of the disc medium changing.

Further, in such disc media, shortening of the wavelength of the laser beam which is illuminated onto the recording surface has been proposed in order to increase the recording capacity. When recording or playback of information is carried out by using this short-wavelength laser beam (e.g., a blue-violet color laser), in order to suppress the attenuation of the laser beam due to the cover layer which protects the recording surface of the disc medium, the cover layer must be made thin. By making the cover layer thin in this way, the diameter of the laser beam at the surface of the cover layer (the surface which is exposed to the exterior) decreases, and it is not possible to ignore the effects of dust and the like adhering to the surface of the cover layer.

Thus, disc cartridges, which accommodate a disc medium in a case and prevent adhesion of dust or the like onto the disc medium, are employed. Such a disc cartridge is formed to include an opening, which is for exposing to the exterior a center hole portion (center core portion) provided at the central portion of the disc medium and a portion of the recording surface (the cover layer), and a shutter member which opens and closes this opening.

In this way, in the disc cartridge, by closing the opening by the shutter member when the disc medium is not in use, entry of dust or the like into the disc cartridge, i.e., adhesion of dust or the like onto the disc medium, is prevented. At the time when the disc medium is used, by opening the opening as the disc cartridge is loaded into the drive device, the center hole portion (the center core portion) can be held by a rotation spindle shaft, and the laser head can approach the recording surface (laser beam can be illuminated).

However, in such a disc cartridge, even if the disc medium is such that information recorded/unrecorded regions can be visually judged by a change in the hue of the recording layer, because the disc medium is housed in a case, if the disc cartridge is not loaded into a drive device, it is not possible to recognize the correct unrecorded amount. Thus, it is inconvenient for the user of the disc cartridge, and the ability to easily visually recognize the approximate unrecorded amount of the disc medium has been desired in the conventional art.

Further, in such a disc cartridge, in the aforementioned state in which the opening is open, there is the need to ensure a space for accommodating the shutter member, and a problem arises in that it is difficult to make the disc cartridge compact. Thus, to aim for compactness, a disc cartridge in which the shutter member is divided in two has been disclosed in Japanese Patent Application Laid-Open (JP-A) No. 2000-30394 and the like. In the disc cartridge of JP-A 2000-30394, the entire opening is closed in a state in which the end surfaces of a first shutter member, which mainly closes the opening portion for laser head insertion (approach), and a second shutter member, which mainly closes the opening portion for insertion of the rotation spindle shaft, abut one another.

When this disc cartridge (disc medium) is to be used, it is loaded (inserted) into a drive device. Along with this loading, a lock releasing lever, which is disposed within an arm guide groove, is operated, and a moving operation portion, which is connected to the first shutter member, is moved along the arm guide groove. In this way, the first shutter member is rotated in the direction of opening the opening while a circular-arc-shaped guide portion of the first shutter member slides along a tubular inner wall provided at a case.

Further, along with this rotation, the second shutter member is pressed by a convex portion of the first shutter member which abuts an engagement portion of the second shutter member. The second shutter member rotates in a direction of opening the opening, which is different than that of the first shutter member. In this way, the first shutter member and the second shutter member are accommodated within accommodating spaces which substantially correspond to the projection surface area of the disc-shaped disc medium. Thus, this disc cartridge aims for a reduction in size and a reduction in thickness, while preventing adhesion of dust and the like onto the disc medium.

With such a conventional disc cartridge, at the time of closing the opening which has been opened, due to the urging force of a torsion spring which urges the second shutter member in the closing direction, not only is the second shutter member rotated, but also, the first shutter member, whose sliding resistance accompanying rotation (mainly, the sliding resistance between the guide portion and the inner wall) is large, is also rotated. Thus, there are cases in which the operations of the first shutter member and the second shutter member are not carried out smoothly. Further, in order to make these operations smooth, excessive machining precision and assembly precision are required at each portion, which is a cause of high costs.

Moreover, in order to rotate the first shutter member as well, the spring constant of the torsion spring must be made large, and a problem arises in that the handling of the torsion spring is complex and the assemblability thereof is poor. In particular, because the torsion spring is disposed in a vicinity of the rotation shaft of the second shutter member, the spring constant must be made even greater. This problem becomes marked, and the torsion spring itself must be made larger. A problem arises in that either the entire disc cartridge becomes larger sized, or the regions of operation of the respective shutter members become smaller (i.e., the opening becomes smaller and cannot handle large-sized laser heads or the like).

On the other hand, JP-A 2000-30394 also discloses a structure in which the moving operation portion, which is connected to the first shutter member, is moved in the direction opposite to the time of opening the opening, and the first shutter member is rotated in the closing direction. However, the connecting portion, which connects the first shutter member and the moving operation portion, is structured as an elastic thin plate in order to convert the rectilinear direction moving force of the moving operation portion into circumferential direction moving force which rotates the first shutter member. Thus, no problems arise in the operation in the pulling direction (the direction of opening the opening), but it is easy for deformation such as buckling or the like to occur due to operation in the compressing direction. Therefore, in this disc cartridge, there are cases in which, when a disc medium is used, the opening which has been opened cannot be closed.

Further, as shown in FIG. 27, in the case of a disc cartridge 170 which rotatably accommodates a disc-shaped disc medium 180 within a case which is formed by a top shell 174 and a bottom shell 172 being joined together, at the bottom shell 172, an opening 178, by which the disc medium 180 can be accessed, is formed by being cut-out from an end portion in a substantial U shape as seen in plan view. Shutter members 182, 184, which open and close the opening 178, are movably accommodated between the bottom shell 172 and a covering plate portion 176 in which a similar opening 190 is formed.

Accordingly, it is desirable that the bottom shell 172 be manufactured by injection molding or the like by a resin member or the like which increases the slidability, i.e., the rotatability, of the shutter members 182, 184. However, the opening 178 formed in the bottom shell 172 is formed by being cut-out in a substantial U shape as seen in plan view. Thus, twisting due to strain or the like at the time of injection molding, e.g., forces in opposite directions as shown by arrows E, F in the figure, may be applied to distal ends 186, 188, which oppose one another across the cut-out substantial U shape, and flexural deformation, such as the bottom shell 172 twisting, may arise.

When such twisting (flexing) arises at the bottom shell 172, the rotatability of the shutter members 182, 184 deteriorates, and the drawback arises that the openings 178, 190 of the disc cartridge 170 do not open smoothly. Further, the shutter members 182, 184 inappropriately contact the bottom shell 172, and dust or the like is generated. Due to this dust or the like adhering to the recording surface of the disc medium 180, the drawback may arise that it will lead to errors at the time of recording and playback.

Moreover, when such a disc cartridge is loaded into a drive device, it suffices for the force for pushing-in the disc cartridge to be applied parallel to the loading direction. However, for example, if a vicinity of a corner portion of the disc cartridge is pushed and force is applied in a diagonal direction, because the disc cartridge is flat and there is little difference in the front-back and left-right lengths thereof, the disc cartridge lacks a regulating force which regulates, in the loading direction, the force applied in the diagonal direction, and a drawback arises in that it is difficult to load the disc cartridge into the drive device.

SUMMARY OF THE INVENTION

The object of the present invention is to provide a disc cartridge which accommodates a disc medium which can be recorded at least one time and in which the recorded/unrecorded regions can be visually identified, wherein the unrecorded amount can be easily recognized visually from the exterior, a pair of shutter members are smoothly operated such that an opening for accessing the disc medium accommodated in the interior can be reliably closed, the flatness of a case can be ensured such that the rotatability of the shutter members does not deteriorate, and loading into a drive device can be carried out smoothly and stably.

In order to achieve the above object, the disc cartridge of a first aspect of the present invention is a disc cartridge provided with a case which accommodates a disc-shaped disc medium at which information recorded/unrecorded regions can be visually identified, wherein a visual recognition portion for enabling visual recognition of the recorded/unrecorded regions is provided at a disc medium recording surface side of the case.

With such a structure, the recorded/unrecorded regions of the disc medium can be easily visually confirmed from the exterior. Thus, the approximate unrecorded amount of the disc medium can be easily recognized, and the convenience of use of the disc cartridge can be improved as compared to the prior art.

The disc cartridge of a second aspect of the present invention is a disc cartridge having: a case which is formed by joining a top shell and a bottom shell, and which rotatably accommodates a disc-shaped disc medium which can be recorded on at least one time and at which recorded/unrecorded regions can be visually identified; an opening, provided in the case, for access to the disc medium; a shutter portion which is provided at an outer side of the case and at a disc medium recording surface side of the case, and which opens and closes the opening; and a covering plate portion in which an opening for access to the disc medium is formed, the shutter member being movably accommodated between the covering plate portion and the case, wherein a transparent window portion, which enables visual recognition of the recorded/unrecorded regions of the disc medium, is provided each at a region of the covering plate portion which region is other than a region where the shutter portion is disposed when the opening is closed, and in a portion of at least one of the top shell and the bottom shell which portion corresponds to the region of the covering plate portion at which the transparent window is provided.

With such a structure, the recorded/unrecorded regions of the disc medium can be easily visually confirmed from the exterior. Thus, the approximate unrecorded amount of the disc medium can be easily recognized, and the convenience of use of the disc cartridge can be improved as compared to the prior art. Further, the transparent window is provided at a position which is not covered by the shutter portion at the time when the shutter portion closes the opening. Thus, the approximate unrecorded amount can be suitably recognized at times when the disc cartridge is not in use.

The disc cartridge of the third aspect of the present invention is a disc cartridge having: a case which is formed by joining a top shell and a bottom shell, and which rotatably accommodates a disc-shaped disc medium which can be recorded on at least one time and at which recorded/unrecorded regions can be visually identified; an opening, provided in the case, for access to the disc medium; a shutter portion which is provided at an outer side of the case and at a disc medium recording surface side of the case, and which opens and closes the opening; and a covering plate portion in which an opening for access to the disc medium is formed, the shutter portion being movably accommodated between the covering plate portion and the case, wherein the covering plate portion is formed by a transparent member, and a transparent window portion, which enables visual recognition of the recorded/unrecorded regions of the disc medium, is provided at a region of one of the top shell and the bottom shell which region is other than a region where the shutter portion is disposed when the opening is closed.

With such a structure, the recorded/unrecorded regions of the disc medium can be easily visually confirmed from the exterior. Thus, the approximate unrecorded amount of the disc medium can be easily recognized, and the convenience of use of the disc cartridge can be improved as compared to the prior art. Further, the transparent member is provided at a position which is not covered by the shutter portion at the time when the shutter portion closes the opening, and the covering plate portion is transparent. Thus, the approximate unrecorded amount can be suitably recognized at times when the disc cartridge is not in use.

The disc cartridge of the fourth aspect is a disc cartridge having: a case which is formed by joining a top shell and a bottom shell, and which rotatably accommodates a disc-shaped disc medium which can be recorded on at least one time and at which recorded/unrecorded regions can be visually identified; an opening, provided in the case, for access to the disc medium; a shutter portion which is provided at an outer side of the case and at a disc medium recording surface side of the case, and which opens and closes the opening; and a covering plate portion in which the opening for access to the disc medium is formed, the shutter portion being movably accommodated between the covering plate portion and the case, wherein the covering plate portion is formed by a transparent member, and one of an aperture and a cut-out portion, which enables visual recognition of the recorded/unrecorded regions of the disc medium, is provided at a region of one of the top shell and the bottom shell which region is other than a region where the shutter portion is disposed when the opening is closed.

With such a structure, the recorded/unrecorded regions of the disc medium can be easily visually confirmed from the exterior. Thus, the approximate unrecorded amount of the disc medium can be easily recognized, and the convenience of use of the disc cartridge can be improved as compared to the prior art. Further, by making the covering plate portion transparent, it suffices to provide an aperture or a cut-out portion only at the top shell and/or the bottom shell. Thus, the manufacturing costs can be decreased.

In the disc cartridge of the fifth aspect, in the disc cartridge of any of the second through fourth aspects, the window portion and the aperture and the cut-out portion are formed substantially radially in substantial correspondence with a length from an inner periphery to an outer periphery at a recording surface of the disc medium. With such a structure, the recording region of the disc medium is formed from the inner periphery thereof toward the outer periphery thereof. Thus, the recorded region and the unrecorded region thereof can be reliably recognized.

In the disc cartridge of the sixth aspect, in the disc cartridge of any of the second through fifth aspects, a scale, which enables recognition of a capacity of one of a recorded region and an unrecorded region of the disc medium, is provided at one of the transparent window portion and the transparent member. With this structure, the accurate recorded amount or unrecorded amount of the disc medium can be easily grasped merely by reading the scale. Thus, the convenience of use of the disc cartridge can be improved even more.

In the disc cartridge of the seventh aspect, in the disc cartridge of any of the second through sixth aspects, at least one of the transparent window portion and the transparent member is formed of a material which attenuates transmission of neighboring wavelengths including a recording wavelength of the disc medium. In this way, the deteriorating effects of ultraviolet light on the recording surface of the disc medium can be prevented.

In the disc cartridge of the eighth aspect, in the disc cartridge of any of the second through sixth aspects, a substance, which attenuates transmission of neighboring wavelengths including a recording wavelength of the disc medium, is applied on at least a surface of at least one of the transparent window portion and the transparent member. In this way, the deteriorating effects of ultraviolet light on the recording surface of the disc medium can be prevented.

In the disc cartridge of the ninth aspect, in the disc cartridge of any of the second through sixth aspects, a substance, which attenuates transmission of neighboring wavelengths including a recording wavelength of the disc medium, is kneaded into at least one of the transparent window portion and the transparent member. In this way, the deteriorating effects of ultraviolet light on the recording surface of the disc medium can be prevented.

The disc cartridge of the tenth aspect is a disc cartridge in which an opening, which is for accessing a disc-shaped disc medium, which is provided in a case which rotatably accommodates the disc medium, is, at a time of non-use of the disc medium, closed by end surfaces of a first shutter member and a second shutter member abutting one another, and at a time of use of the disc medium, opened by the first shutter member and the second shutter member moving in respectively different directions, the disc cartridge comprising: a first urging member for urging the first shutter member in a direction of closing the opening; and a second urging member for urging the second shutter member in a direction of closing the opening.

In the disc cartridge of the tenth aspect, the opening for accessing the disc medium is provided in one surface or in both surfaces of the case which rotatably accommodates the disc medium which is disc-shaped. When the disc medium is not in use, end surfaces of the first shutter member and the second shutter member abut one another, such that the opening is closed. Accordingly, entry of dust or the like into the case is prevented.

At the disc cartridge, when the disc medium is in use (e.g., when the disc cartridge is being loaded into a drive device or after loading has been completed), the first shutter member and the second shutter member move in respectively different directions so as to open the opening. Then, the disc medium can be accessed from this opening. Namely, the disc medium is operated from this opening (e.g., is rotated by a rotation spindle shaft, or laser beam is illuminated thereon by a laser head), and recording or playback of information is carried out.

Here, because the first urging member and the second urging member are provided, at the time when the opening is closed from the state in which the opening is open, the first shutter member is moved to the position of closing the opening by the urging force of the first urging member, and the second shutter member is moved to the position of closing the opening by the urging force of the second urging member. Thus, the first shutter member and the second shutter member are appropriately urged in accordance with the respective moving directions thereof, and each can move (operate) smoothly. Further, because the first shutter member and the second shutter member move to positions of closing the opening merely due to the urging forces, the opening can be reliably closed without deformation such as buckling or the like as in the prior art.

Moreover, the first shutter member and the second shutter member are respectively urged independently. Thus, the urging forces by the first urging member and the second urging member do not become too large, and handling of the urging member at, for example, the time of assembly is easy. In this way, in the disc cartridge of the tenth aspect, the pair of shutter members operate smoothly, and the opening, which is for access to the disc medium accommodated in the interior, can be reliably closed.

The disc cartridge of the eleventh aspect is a disc cartridge having: a case having a tubular wall which is formed in a substantially tubular shape, the case rotatably accommodating a disc-shaped disc medium at an inner side of the tubular wall; an opening, provided in the case, for access to the disc medium; a first shutter member which is formed so as to be able to close a portion of the opening, and which has a circular-arc-shaped guide portion which curves along the tubular wall; and a second shutter member which is able to close a remaining portion of the opening, and at a time of non-use of the disc medium, end surfaces of the first shutter member and the second shutter member abut one another and the opening is closed, and at a time of use of the disc medium, the circular-arc-shaped guide portion moves along the tubular wall, the first shutter member rotates, the second shutter member moves in a direction different than the first shutter member, and the opening is opened, wherein the disc cartridge comprises: a first urging member for urging the first shutter member in a direction of closing the opening; and a second urging member for urging the second shutter member in a direction of closing the opening.

In the disc cartridge of the eleventh aspect, the opening for access to the disc-shaped disc medium is provided in the case in which the disc medium is rotatably accommodated at the inner side of the tubular wall. When the disc medium is not in use, end surfaces of the first shutter member, which can close one portion of the opening, and the second shutter member, which can close the remaining portion of the opening, abut one another, so as to close the opening. Thus, entry of dust or the like into the case is prevented.

In this disc cartridge, when the disc medium is in use (e.g., when the disc cartridge is being loaded into a drive device or after loading has been completed), the circular-arc-shaped guide portion moves along the tubular wall and the first shutter member rotates, and the second shutter member moves in a direction different from the first shutter member, such that the opening is opened. Then, the disc medium can be accessed from this opening. Namely, the disc medium is operated from this opening (e.g., is rotated by a rotation spindle shaft, or laser beam is illuminated thereon by a laser head), and recording or playback of information is carried out.

Because the first urging member and the second urging member are provided, when the opening is closed from the state in which the opening is open, due to the urging force of the first urging member, the first shutter member rotates to a position of closing the opening while the circular-arc-shaped guide portion moves along the tubular wall, and due to the urging force of the second urging member, the second shutter member moves to a position of closing the opening. Thus, the first shutter member and the second shutter member are appropriately urged in accordance with the respective moving (rotating) directions thereof, and each can move (operate) smoothly at the time of closing the opening. Further, because the first shutter member and the second shutter member move to positions of closing the opening merely due to the urging forces, there are no regions at which deformation, such as buckling or the like, occurs as in the prior art, and the opening can be reliably closed.

Moreover, the first shutter member and the second shutter member are respectively urged independently. Thus, the urging forces by the first urging member and the second urging member do not become too large, and handling of the urging member at, for example, the time of assembly is easy. In this way, in the disc cartridge of the eleventh aspect, the pair of shutter members operate smoothly, and the opening, which is for accessing the disc medium accommodated in the interior, can be reliably closed. In this way, the first shutter member is guided by the tubular wall at the circular-arc-shaped guide portion, and operates reliably.

Further, in this structure, the moving resistance of the first shutter member, which has the circular-arc-shaped guide portion which moves (slides) along the tubular wall, is large. However, the first shutter member is urged by the first urging member in the direction of closing the opening, independently of the second shutter member. Thus, due to the urging force of the first urging member, the first shutter member can smoothly close the opening. Further, the urging force (e.g., in a case in which a spring is used, the spring constant thereof) of the second urging member, which urges the second shutter member, does not become too large. Handling of the urging member at, for example, the time of assembly is easy, the disc cartridge does not become large-sized, and the opening for access to the disc medium can be made large.

In the disc cartridge of the twelfth aspect, in the disc cartridge of the eleventh aspect, the first urging member is a coil spring whose one end portion is connected to the circular-arc-shaped guide portion, and whose another end portion is connected to the case, and which expands and contracts along the tubular wall. In the disc cartridge of the twelfth aspect, the first shutter member is urged in the direction of closing the opening, by the coil spring which expands and contracts along the tubular wall.

In this way, when the first urging member is a coil spring which expands and contracts along the tubular wall, urging force in the tangential direction or in the peripheral direction of the tubular wall can be applied, with a simple structure, to the first shutter member which is rotated by the circular-arc-shaped guide portion moving along the tubular wall (i.e., it is not necessary to have a rotation shaft). Thus, the structure is even more suitable. Moreover, one end portion of the coil spring is connected to the circular-arc-shaped guide portion which moves along the tubular wall at whose inner side the disc medium is accommodated. Thus, the rotation moment of the first shutter member due to the urging force of the coil spring is large (the spring constant can be made small), which is suitable.

In the disc cartridge of the thirteenth aspect, in the disc cartridge of the eleventh aspect, the first urging member is a power spring whose one end portion is connected to the circular-arc-shaped guide portion, and whose another end portion is connected to the case, and which is pulled-out and wound-up along the tubular wall. In the disc cartridge of the thirteenth aspect, the first shutter member is urged in the direction of closing the opening, by a power spring (which may be a spiral spring) which is pulled-out and taken-up along the tubular wall.

In this way, when the first urging member is a power spring which is pulled-out and taken-up along the tubular wall, urging force in the tangential direction or in the peripheral direction of the tubular wall can be applied, with a simple structure, to the first shutter member which is rotated by the circular-arc-shaped guide portion moving along the tubular wall (i.e., it is not necessary to have a rotation shaft). Thus, the structure is even more suitable. Moreover, one end portion of the power spring is connected to the circular-arc-shaped guide portion which moves along the tubular wall at whose inner side the disc medium is accommodated. Thus, the rotation moment of the first shutter member due to the urging force of the power spring is large (the spring constant can be made small), which is suitable.

The disc cartridge of the fourteenth aspect of the present invention is a disc cartridge having: a case which is formed by joining a top shell and a bottom shell, and which rotatably accommodates a disc-shaped disc medium at an inner portion; an opening which is provided by being cut-out in a substantial U shape, as seen in plan view, from an end portion of the bottom shell, and which is for access to the disc medium; a shutter portion which is provided at an outer side of the bottom shell, and which opens and closes the opening; and a covering plate portion which has an opening which is provided by being cut-out in a substantial U shape, as seen in plan view, from an end portion so as to overlap said opening, the shutter portion being movably accommodated between the covering plate portion and the bottom shell, wherein a connecting member spans along an outer configuration of the bottom shell between end portions of the opening provided in the bottom shell.

With this structure, the strength of the bottom shell can be improved, twisting arising at the opening end portion of the bottom shell can be prevented, and the flatness of the bottom shell can be suitably ensured. Thus, the drawback of the rotatability of the shutter portion deteriorating does not occur. Accordingly, inappropriate contact with the bottom shell can be prevented, and the generation of dust or the like can be prevented. Thus, the occurrence of errors at the time of recording and playback can be reduced.

The disc cartridge of the fifteenth aspect is a disc cartridge having: a case which is formed by joining a top shell and a bottom shell, and which rotatably accommodates a disc-shaped disc medium at an inner portion; an opening which is provided by being cut-out in a substantial U shape, as seen in plan view, from an end portion of the bottom shell, and which is for access to the disc medium; a shutter portion which is provided at an outer side of the bottom shell, and which opens and closes the opening; and a covering plate portion which has an opening which is provided by being cut-out in a substantial U shape, as seen in plan view, from an end portion so as to overlap said opening, the shutter portion being movably accommodated between the covering plate portion and the bottom shell, wherein an end portion of the opening provided in the bottom shell is fixed to an inner surface of the top shell.

With this structure, because the top shell is rigid, by fixing the opening end portion of the bottom shell to the inner surface of the top shell, the strength of the bottom shell can be improved. Accordingly, twisting arising at the opening end portion of the bottom shell can be prevented, and the flatness of the bottom shell can be suitably ensured. Thus, the drawback of the rotatability of the shutter portion deteriorating does not occur. Accordingly, inappropriate contact with the bottom shell can be prevented, and the generation of dust or the like can be prevented. Thus, the occurrence of errors at the time of recording and playback can be reduced.

The disc cartridge of the sixteenth aspect is a disc cartridge having a shutter portion which can open and close an opening for access to a disc-shaped disc medium, which opening is formed in at least one surface of a case which rotatably accommodates the disc medium, wherein a push portion for fingers at a time of loading the disc cartridge into a drive device is provided at a rear surface of the case.

By providing such a push portion, at the time the disc cartridge is loaded into the drive device, due to the user pressing the push portion with his/her fingers, the user can load the disc cartridge while applying force thereto parallel to the direction of loading. Accordingly, loading into the drive device can be carried out smoothly and stably.

In the disc cartridge of the seventeenth aspect, in the disc cartridge of the sixteenth aspect, the push portion is provided at a center of the rear surface or at a center from the rear surface to at least one of a top surface and a bottom surface. In this way, force can reliably be applied parallel to the loading direction.

In the disc cartridge of the eighteenth aspect, in the disc cartridge of either the sixteenth or seventeenth aspect, the push portion is formed in a concave shape. In this way, the user can easily recognize the push portion.

In the disc cartridge of the nineteenth aspect, in the disc cartridge of either the sixteenth or seventeenth aspect, the push portion is formed in a convex shape. In this way, the user can easily recognize the push portion.

In the disc cartridge of the twentieth aspect, in the disc cartridge of any of the sixteenth through nineteenth aspects, the push portion is subjected to a surface roughening treatment. In this way, force can reliably be applied without the fingers slipping off of the push portion, and even more stable loading can be carried out.

BRIEF DESCRIPTION OF THE DRAWINGS

FIG. 15 is a view, corresponding to FIG. 14, showing a lock released state of the disc cartridge relating to the present invention.

FIG. 21A is a perspective view, as seen from the rear and above at an angle, of the disc cartridge relating to the present invention.

FIG. 21B is a perspective view, as seen from the rear and below at an angle, of the disc cartridge relating to the present invention.

DESCRIPTION OF THE PREFERRED EMBODIMENTS

Hereinafter, a disc cartridge 10 relating to the embodiments of the present invention will be described in detail on the basis of the embodiments illustrated in FIGS. 1 through 26. Note that, in FIGS. 1 through 26, when arrow FR, arrow RE, arrow UP, arrow LO, arrow LE and arrow RI are used, they indicate, respectively, the front direction (the loading direction), the rear direction, the upward direction, the downward direction, the leftward direction, and the rightward direction of the disc cartridge 10 while looking in the direction of loading (inserting) the disc cartridge 10 into the drive device. Hereinafter, when the up-down, front-rear, left-right directions are indicated, they correspond to the directions of the respective arrows.

Further, these respective directions are for convenience of explanation, and are of course not intended to limit the directions at the time of using the disc cartridge 10. Accordingly, for example, the disc cartridge 10 may be disposed horizontally or may be disposed vertically at the time of use thereof.

Figure 1A:
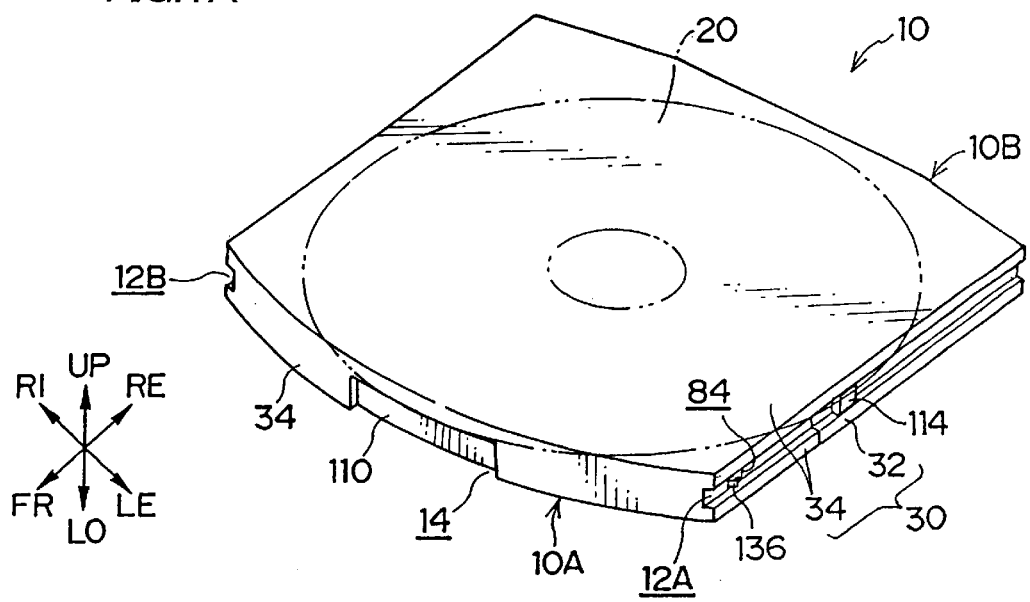
FIG. 1A is a perspective view, as seen from the front and above at an angle, of a disc cartridge relating to the present invention.
Figure 1B:
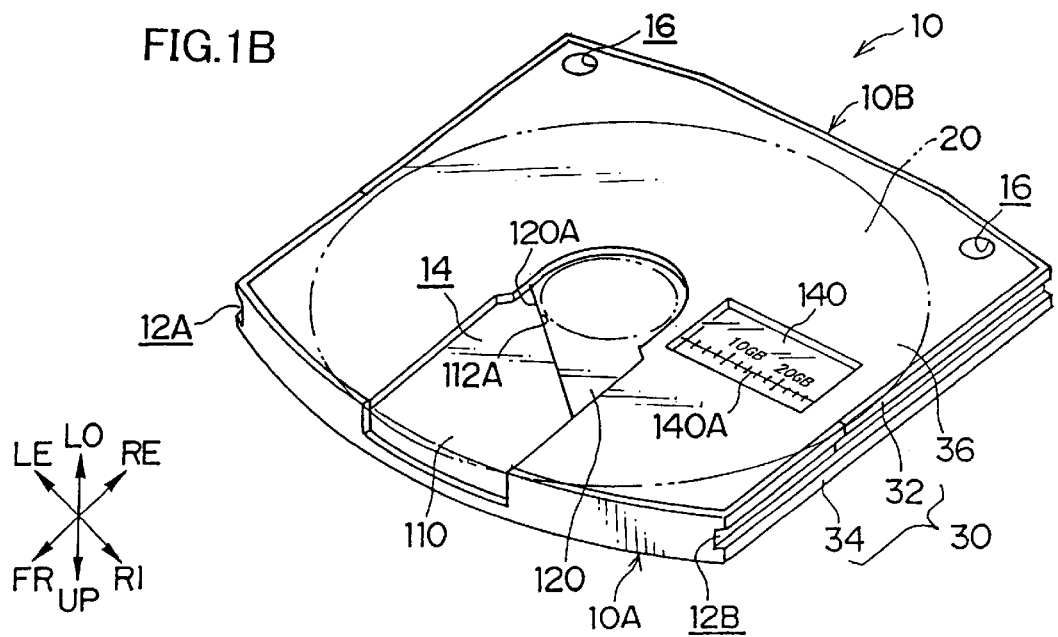
FIG. 1B is a perspective view, as seen from the front and below at an angle, of the disc cartridge relating to the present invention.

First, a summary of the disc cartridge 10 will be given. In FIG. 1A, the exterior, when the disc cartridge 10 is viewed from the front and above at an angle, is illustrated in a perspective view. In FIG. 1B, the exterior, when the disc cartridge 10 is viewed from the front and below at an angle, is illustrated in a perspective view. As shown in these figures, the disc cartridge 10 is formed on the whole in a flat case shape. A disc-shaped disc media 20, which serves as an information recording/playback medium and which will be described later, is accommodated within the disc cartridge 10.

The disc cartridge 10 is formed in a polygonal configuration in which a front end portion 10A is curved in a circular-arc shape, and left and right corner portions of a rear end portion 10B are cut-out due to required functions thereof. Further, the front-back dimension of the disc cartridge 10 is slightly larger than the left-right dimension thereof. For these reasons, the disc cartridge 10 is structured such that the loading direction into a drive device (not shown) can be easily recognized from the external appearance, and loading into the drive device from an incorrect direction is not permitted.

A first guide groove 12A and a second guide groove 12B are provided at the left and right side surfaces of the disc cartridge 10, respectively, and are for guiding at the time of loading the disc cartridge 10 into a drive device. Note that a lock releasing lever 136 and a shutter engaging portion 114, which will be described later, project at the intermediate portion of the first guide groove 12A.

An opening 14 is provided from the central portion of the bottom surface of the disc cartridge 10 to the left-right direction central portion of the front wall portion of the front end portion 10A. The opening 14 is for access to the disc medium 20 when the disc medium 20 is used. Namely, when the disc medium 20 is used, a rotation spindle shaft and a recording/playback head (e.g., a laser head) of the drive device are inserted and made to approach from the opening 14. When the disc medium 20 is not being used, the opening 14 is closed by a first shutter member 110 and a second shutter member 120, which will be described later and which are accommodated within the disc cartridge 10, such that entry of dust and the like into the disc cartridge 10 is prohibited.

Two holes 16 for position regulation are formed in a vicinity of the rear end portion 10B of the bottom surface of the disc cartridge 10. The holes 16 for position regulation are for regulating (detecting) the position of the disc cartridge 10 within the drive device. Further, a window portion 140 and a scale 140A, which will be described later, are provided at the right side of the bottom surface of the disc cartridge 10.

The disc cartridge 10 is loaded into the drive device to the front (the direction of arrow FR) while being guided into the drive device at the first guide groove 12A and the second guide groove 12B. Accompanying this loading, the opening 14 is opened, and the disc cartridge 10 is set, by the holes 16 for position regulation, in a position-detected and positioned state in the drive device. Within the drive device, recording of information onto the disc medium 20 or playback of information recorded on the disc medium 20 is carried out.

Figure 2:
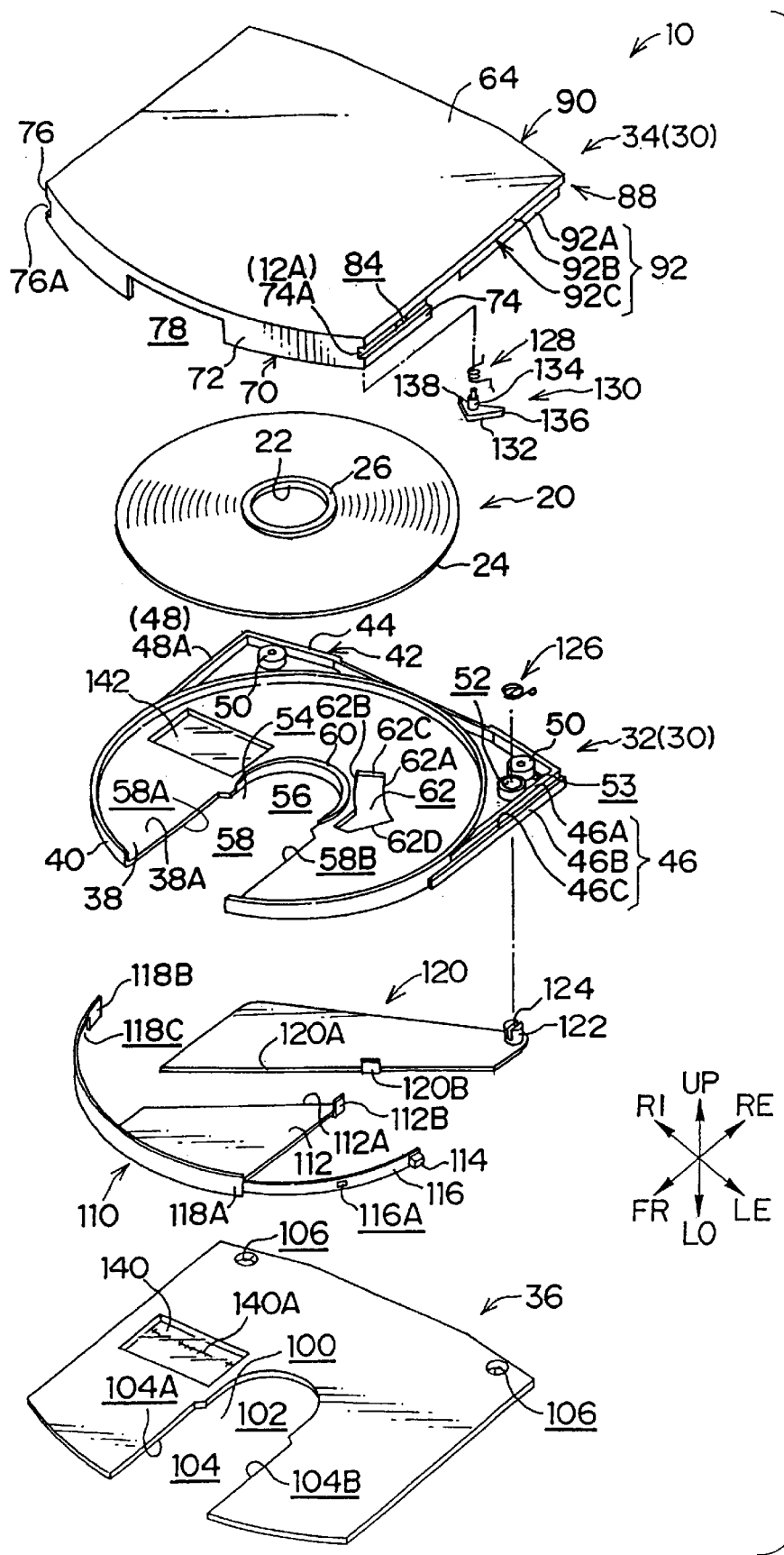
FIG. 2 is an exploded perspective view, as seen from above at an angle, of the disc cartridge relating to the present invention.
Figure 3:
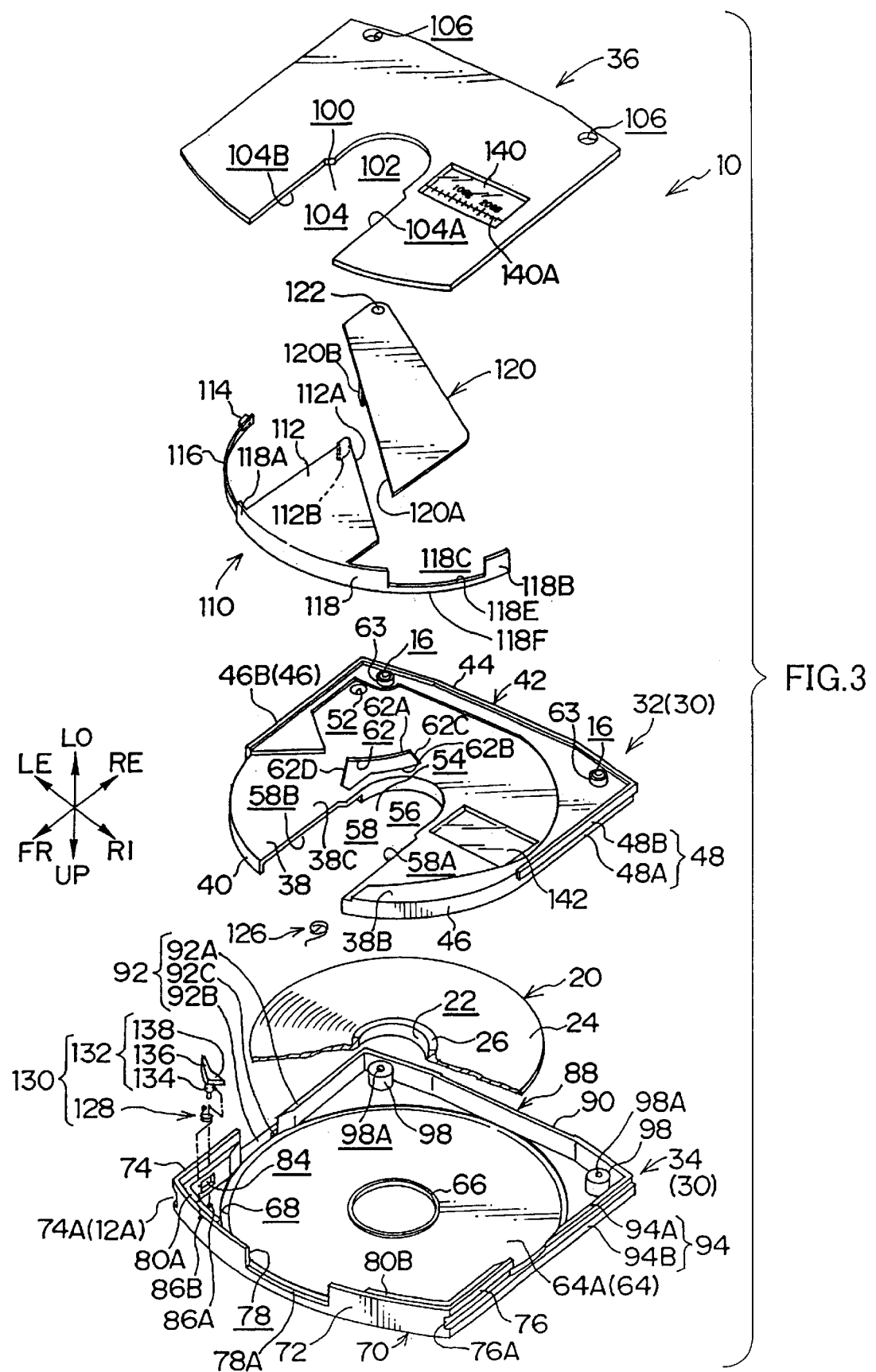
FIG. 3 is an exploded perspective view, as seen from below at an angle, of the disc cartridge relating to the present invention.

Next, to describe the detailed structure of the disc cartridge 10, as shown in the exploded perspective views of FIGS. 2 and 3, the disc cartridge 10 is provided with the disc medium 20. The disc medium 20 is formed in a disc shape having a center hole 22 in the central portion thereof. The recording surface, which is formed on a bottom surface 24 of the disc medium 20, is covered and protected by a cover layer (both the recording surface and the cover layer are not shown in the figures). An annular center core portion 26 is mounted by adhesion or the like to the center hole 22 of the disc medium 20. The center core portion 26 is engaged and held or is suctioned and held by the distal end portion of the rotation spindle shaft of the drive device.

The disc medium 20 is accommodated within a case 30. The case 30 is formed by the joining of a base plate portion 32 which serves as a bottom shell and a top surface plate portion 34 which serves as a top shell. The lower side of the case 30 (the base plate portion 32) is covered by a bottom surface plate portion 36 which serves as a covering plate portion. The first shutter member 110 and the second shutter member 120 are accommodated between the case 30 (the base plate portion 32) and the bottom surface plate portion 36.

The base plate portion 32 is provided with a base bottom portion 38 which is formed by a thin plate, and whose front portion is formed in a semicircular shape, and whose rear portion is formed in a substantially rectangular shape which circumscribes the remaining semicircular portion. At the peripheral edge of the front semicircular portion and the rear semicircular portion of the base bottom portion 38, a tubular wall 40, which is coaxial with and has the same diameter as the circular portion, stands upright, extending upwardly by a predetermined height. Note that the inner diameter of this tubular wall 40 is slightly larger than the outer diameter of the disc medium 20.

A peripheral wall 42, which is substantially U-shaped in plan view, stands upright at the outer peripheral edge of the substantially rectangular rear portion of the base bottom portion 38, so as to enclose substantially the rear half of the tubular wall 40. A rear wall 44 of the peripheral wall 42 is formed in a bent line configuration in which the left and right corner portions are slightly folded over toward the front as seen in plan view. The rear wall 44 corresponds to the rear end portion 10B of the disc cartridge 10. The height of the rear wall 44 from a top surface 38A of the base bottom portion 38 is at a lower level than the tubular wall 40, and the rear wall 44 projects further downward than a bottom surface 38B of the base bottom portion 38 (see FIGS. 2 and 3).

A left wall 46 of the peripheral wall 42 is formed by a left inner wall 46A and a left outer wall 46B. The outer surface of the left inner wall 46A is formed along a line which is tangent to the tubular wall 40 and parallel to the front-back direction. The front end surface of the left inner wall 46A contacts the outer peripheral surface of the tubular wall 40 along this outer peripheral surface. The left outer wall 46B is provided at the outer side (the left side) of the left inner wall 46A and extends slightly further forward than the front-back direction central portion of the tubular wall 40. The left inner wall 46A stands upright only at the top surface 38A side of the base bottom portion 38, and is at the same heightwise level as the rear wall 44. The left outer wall 46B is, at the top surface 38A side, at a lower level than the left inner wall 46A, and at the bottom surface 38B side, is at the same heightwise level as the rear wall 44. A thin groove 46C, which opens upwardly, is formed between, on the one hand, the left outer wall 46B, and on the other hand, the left inner wall 46A and the tubular wall 40.

A right wall 48 of the peripheral wall 42 has a similar structure as that of the left wall 46, but no thin groove is formed at the right wall 48 side. In this way, at the top surface 38A side of the base bottom portion 38, the peripheral wall 42 forms a substantial U shape, as seen in plan view, in which the rear wall 44 and the left inner wall 46A and a right inner wall 48A are at the same heightwise level, and is a region of abutment with a peripheral wall 88 of the top surface plate portion 34. At the bottom surface 38B side of the base bottom portion 38, the peripheral wall 42 forms a substantial U shape, as seen in plan view, in which the rear wall 44 and the left outer wall 46B and a right outer wall 48B are at the same heightwise level, and is a region of fitting together with the bottom surface plate portion 36.

The outer surface (left side surface) of the left inner wall 46A is the bottom surface lower portion of the rear portion of the first guide groove 12A of the disc cartridge 10. The top end surface of the left outer wall 46B is the bottom side wall surface of the rear portion of the first guide groove 12A. The outer surface (right side surface) of the right inner wall 48A is the bottom surface lower portion of the rear portion of the second guide groove 12B of the disc cartridge 10. The top end surface of the right outer wall 48B is the lower side wall surface of the rear portion of the second guide groove 12B.

A tubular projection 50 stands upright at each of the rear end corner portions of the top surface 38A of the base bottom portion 38, between the tubular wall 40 and the peripheral wall 42. The tubular projection 50 is at the same heightwise level as the rear wall 44 of the peripheral wall 42. Although not shown, a through-hole and a conical screw receiving portion, which corresponds to the head portion of a screw for fixing, are formed at the interior of the tubular projection 50.

A tubular shutter shaft hole 52 is provided in the vicinity of the left side tubular projection 50, and is for rotatably supporting the second shutter member 120. A spring holding portion 53 is provided in a vicinity of the shutter shaft hole 52, and is for holding one end of a torsion spring 126 which will be described later.

An opening 54, which forms the opening 14 of the disc cartridge 10, is formed in the base plate portion 32. The opening 54 is formed by a circular hub hole 56 and a substantially rectangular window portion 58 for a recording/playback head being connected together. The hub hole 56 has a larger diameter than the outer diameter of the center core portion 26 of the disc medium 20. The window portion 58 for a recording/playback head is formed by cutting out the base bottom portion 38 symmetrically to the left and right along the radial direction of the semicircular portion of the base bottom portion 38 until the outer peripheral front end portion thereof, and cutting out the tubular wall 40 thereat as well. The widthwise dimension in the left-right direction of the window portion 58 for a recording/playback head is formed to be large at both the left and right so as to be greater than the diameter of the hub hole 56, except in a vicinity of the portion of connection with the hub hole 56. By providing right and left widened portions 58A, 58B, insertion of a large-sized recording/playback head is possible.

A rib 60, whose top surface 38A side is thick, is provided at the peripheral edge of the hub hole 56 of the base bottom portion 38. A pressing piece 112B of the first shutter member 110, and a shutter guiding hole 62, into which a pressed piece 120B of the second shutter member 120 is inserted, are provided in a vicinity of the left side of the hub hole 56 of the base bottom portion 38. As shown in the figures, the shutter guiding hole 62 is formed in a configuration in which one portion of a substantially fan-shaped front side, which is enclosed by two circular arcs 62A, 62B which are formed concentrically with the axis of the shutter shaft hole 52 and by two straight lines 62C, 62D which are formed radially so as to pass through the axial center of the shutter shaft hole 52, extends further toward the front in a substantially rectangular form.

As shown in FIG. 3, a substantially circular concave portion 38C is formed in the bottom surface 38B of the base plate portion 32 (the base bottom portion 38), and is for forming an operation and accommodation space for a shutter main body 112 of the first shutter member 110 and the second shutter member 120. Namely, at the bottom surface 38B side of the base plate portion 32, the bottom end surface of the peripheral wall 42 projects downwardly, with the bottom surface 38B of the base bottom portion 38 as a reference, such that the concave portion 38C is recessed upwardly.

In this way, by fitting the bottom surface plate portion 36 together with the peripheral wall 42 in a state in which the bottom surface plate portion 36 abuts the bottom surface 38B, a flat space is formed between the bottom surface plate portion 36 and the concave portion 38C. Further, at the bottom surface 38B of the base bottom portion 38, at positions corresponding to the tubular projections 50, tubular projections 63, which communicate coaxially with the interiors of the tubular projections 50, stand erect, directed downwardly, such that screws or tools can be inserted therein. The outer peripheries of the tubular projections 63 are used for positioning the bottom surface plate portion 36. The interiors of the tubular projections 63 are the holes 16 for position regulation of the disc cartridge 10.

The disc medium 20 is accommodated at the inner side of the tubular wall 40 of the above-described base plate portion 32. The disc medium 20 is placed on the rib 60 in a state in which the center core portion 26 of the disc medium 20 is inserted into the hub hole 56. Contact of the disc medium 20 with the top surface 38A of the base bottom portion 38 and the tubular wall 40 is prevented. In this state, the top of the base plate portion 32 is covered by the top surface plate portion 34.

The top surface plate portion 34 is provided with a flat plate portion 64 which is formed in a polygonal shape, and whose rectangular, plate-shaped front end portion is curved in a circular-arc shape, and whose left and right corner portions of the rear end portion are cut-out. The front-back dimension of the flat plate portion 64 is slightly greater than the left-right dimension thereof. An annular projection 66, which corresponds to the rib 60 of the base plate portion 32, is provided at the central portion of a bottom surface 64A of the flat plate portion 64. The annular projection 66 is for preventing the disc medium 20 from contacting the bottom surface 64A.

An annular groove 68, which corresponds to the tubular wall 40 of the base plate portion 32, is formed in the bottom surface 64A of the flat plate portion 64. The annular groove 68 is formed on the whole such that the tubular wall 40 can be inserted therein. The outer diameter of the front portion of the annular groove 68 is slightly greater (the width is wider) than a length between the left outer wall 46B and the right outer wall 48B of the base plate portion 32. As well as the annular wall 40, a circular-arc-shaped guide wall portion 118 of the first shutter member 110 can be inserted into the annular groove 68.

At the outer periphery of the front portion of the flat plate portion 64, an outer wall 70, which is formed in a substantial U shape as seen in plan view, stands erect, directed downwardly, so as to surround the front half of the annular groove 68. The outer wall 70 is of a height which corresponds to the entire thickness of the disc cartridge 10, and is formed by a front wall 72, a left wall 74, and a right wall 76.

The front wall 72 is curved so as to correspond to the curved configuration of the front end of the flat plate portion 64. A rectangular window portion 78, which is cut out such that the lower side is open by a predetermined length, is formed in the left-right direction central portion of the front wall 72. The window portion 78 is for forming the opening 14 of the disc cartridge 10. Namely, the left-right direction widthwise dimension of the window portion 78 corresponds to the widthwise dimension of the window portion 58 for a recording/playback head of the base plate portion 32, and the window portion 78 forms a portion of the opening 14 of the disc cartridge 10. Note that the front wall 72 forms the front end portion 10A of the disc cartridge 10.

The left wall 74 and the right wall 76 extend rearward from the left and right end portions of the front wall 72, respectively. The positions, of the left wall 74 and the right wall 76, which correspond to the front end portions of the left outer wall 46B and the right outer wall 48B of the base plate portion 32, are the rear end portions. Namely, in the assembled state, the respective bottom portions of the rear end surfaces of the left wall 74 and the right wall 76 of the top surface plate portion 34, and the front end surfaces of the left outer wall 46B and the right outer wall 48B of the base plate portion 32, abut one another.

Inner walls 80A and 80B, which are formed along the inner surfaces of the left and right corner portions of the outer wall 70, are provided at the inner side of the outer wall 70. The bottom end surfaces of the inner walls 80A, 80B are positioned slightly above the bottom end surface of the outer wall 70 (are recessed toward the inner side of the disc cartridge 10), and form surfaces for abutment with the top surface of the bottom surface plate portion 36 which is fit together with the outer wall 70.

A lateral groove 74A is formed in the outer surface of the left wall 74 of the outer wall 70 along the front-back direction thereof. The bottom portion of the lateral groove 74A reaches the inner wall 80A. This lateral groove 74A structures a front portion of the first guide groove 12A of the disc cartridge 10. Further, a lock releasing lever hole 84, which communicates the bottom portion of the lateral groove 74A and the inner side of the inner wall 80A, is provided in the inner wall 80A. A shaft hole 86A for rotatably supporting a lock lever 132 which will be described later, and a holding hole 86B for holding one end of the torsion spring 140, are provided in the bottom surface 64A of the flat plate portion 64 in the vicinity of the lock releasing lever hole 84.

The right wall 76 of the outer wall 70 is formed similarly to the left wall 74, and forms the front portion of the second guide groove 12B. A lateral groove 76A, whose bottom portion reaches the inner wall 80B, is formed in the right wall 76. Note that a lock releasing lever hole, a shaft hole, and a holding hole are not provided at the right wall 76 (inner wall 80B) side.

A peripheral wall 88, which corresponds to the peripheral wall 42 of the base plate portion 32, stands erect, directed downward, at the outer periphery of the flat plate portion 64, further toward the rear than the outer wall 70. Namely, the peripheral wall 88 has a rear wall 90, a left wall 92, and a right wall 94, which correspond respectively to the rear wall 44, the left wall 46, and the right wall 48 of the base plate portion 32.

The rear wall 90 abuts the rear wall 44 of the base plate portion 32, and forms the rear end portion 10B of the disc cartridge 10. Further, a left inner wall 92A of the left wall 92 abuts the left inner wall 46A of the base plate portion 32, and a left outer wall 92B and a thin groove 92C of the left wall 92 oppose the left outer wall 46B and the thin groove 46C of the base plate portion 32, respectively. The left wall 92 forms the rear portion left side wall of the disc cartridge 10 and the rear portion of the first guide groove 12A.

The thin grooves 46C, 92C which oppose one another form a shutter guiding groove 96 into which a shutter pull-out portion 116 of the first shutter member 110 is inserted. The shutter guiding groove 96 (the thin groove 92C) communicates with the annular groove 68 in a vicinity of the front end portion of the left inner wall 92A. Namely, in a vicinity of the front end portion of the shutter guiding groove 96, the shutter guiding groove 96 is formed by the thin groove 46C of the base plate portion 32 and a portion of the annular groove 68 in a vicinity of the outer side wall opposing one another.

In the same way as the left wall 92, a right inner wall 94A of the right wall 94 abuts the right inner wall 48A of the base plate portion 32, and a right outer wall 94B opposes the right outer wall 48B of the base plate portion 32. The right wall 94 forms the rear portion right side wall of the disc cartridge 10 and the rear portion of the second guide groove 12B.

Further, cylinders 98 are provided at positions corresponding to the tubular projections 50 of the case plate portion 32, between the peripheral wall 88 and the annular groove 68. The cylinders 98 are at the same heightwise level as the rear wall 90 of the peripheral wall 88, and the bottom end surfaces thereof abut the top end surfaces of the tubular projections 50 of the base plate portion 32. A screw hole 98A is provided in the central portion of the cylinder 98. A screw, whose head portion engages with the screw receiving portion within the tubular projection 50 of the base plate portion 32, is screwed into the screw hole 98A from beneath, and the position of the hole 16 position regulation (the tubular projection 63) with respect to the top surface plate portion 34 is determined.

Further, due to the aforementioned screwing, the base plate portion 32 is connected and held in a state in which the top surface plate portion 34 covers the upper portion of the base plate portion 32, and the case 30 which rotatably houses the disc medium 20 is formed. In this state, the tubular wall 40 of the base plate portion 32 is inserted into the annular groove 68 of the top surface plate portion 34, and the peripheral wall 42 of the base plate portion 32 abuts a portion corresponding to the peripheral wall 88 of the top surface plate portion 34.

On the other hand, the bottom surface plate portion 36 is disposed beneath the base plate portion 32. The bottom surface plate portion 36 is formed such that the external configuration thereof is a flat shape which is substantially the same shape as that of the flat plate portion 64 of the top surface plate portion 34. Due to the outer periphery of the bottom surface plate portion 36 being slightly smaller than that of the flat plate portion 64, the bottom surface plate portion 36 can fit together with the inner peripheral surfaces of the outer wall 70 of the top surface plate portion 34 and the peripheral wall 42 (the rear wall 44, the left outer wall 46B, the right outer wall 48B) of the base plate portion 32.

An opening 100, which is of substantially the same configuration as the opening 54 of the base plate portion 32, is formed in the bottom surface plate portion 36 at a position corresponding to the opening 54. Namely, the opening 100 is formed by a hub hole 102 which corresponds to the hub hole 56, and a window portion 104 for a recording/playback head and right and left widened portions 104A, 104B which correspond to the window portion 58 for a recording/playback head. The opening 100 forms the opening 14 of the disc cartridge 10.

Through holes 106, which correspond to the outer diameters of the tubular projections 63 of the base plate portion 32, are provided in the bottom surface plate portion 36 at positions corresponding to the tubular projections 63. In the state in which the tubular projections 63 of the base plate portion 32 are inserted through the through holes 106 and the top surface of the bottom surface plate portion 36 is abutted by the bottom surface 38B of the base plate portion 32 (the portion other than the concave portion 38C) and the inner walls 80A, 80B of the top surface plate portion 34, the bottom surface plate portion 36 is fit with and held by the peripheral wall 42 (the rear wall 44, the left outer wall 46B, the right outer wall 48B) of the base plate portion 32 and the inner peripheral surface of the outer wall 70 of the top surface plate portion 34.

In this way, the region beneath the case 30, which accommodates the disc medium 20, is covered by the bottom surface plate portion 36. The front end portion 10A, the rear end portion 10B, the first guide groove 12A, the second guide groove 12B, and the two holes 16 for position regulation of the disc cartridge 10 are provided, as described above, in the case 30 whose lower region is covered. In addition, the opening 14 of the disc cartridge 10, at which the opening 54 of the base plate portion 32 and the window portion 78 of the top surface plate portion 34 and the opening 100 of the bottom surface plate portion 36 communicate, is formed in the case 30.

A shutter mechanism is provided in the case 30. The opening 14 is closed or opened by the shutter mechanism. When the respective structural elements of the shutter mechanism are described hereinafter by using the front-back and left-right directions, explanation is basically based on the directions in the state in which the opening 14 is closed.

The shutter mechanism is equipped with the first shutter member 110. The first shutter member 110 is provided with the shutter main body 112 which mainly closes the window portion 58 for a recording/playback head of the base plate portion 32. The shutter main body 112 is formed by a resin member, a metal plate, or the like, and is formed by a thin, flat plate which is shaped such that a substantial trapezoid as seen in plan view (i.e., a rectangle whose front-back dimension is substantially equal to the radius of the tubular wall 40 of the base plate portion 32 and whose transverse dimension is slightly greater than the transverse dimension of the window portion 58 for a recording/playback head) has a front end portion which is formed in a circular-arc shape corresponding to the tubular wall 40 and has a rear right corner portion which is cut-out diagonally.

The thickness of the shutter main body 112 is smaller than the height of the base plate portion 32 from the bottom surface 38B to the concave portion 38C (the top surface of the bottom surface plate portion 36). The end surface (see FIGS. 2 through 4) of the slanted side portion of the shutter main body 112 is an abutment portion 112A with the second shutter member 120. A presser piece 112B, which stands erect, directed upwardly, is provided at the rear left corner portion of the shutter main body 112. The presser piece 112B is for pressing the second shutter member 120.

The circular-arc-shaped guide wall portion 118 stands upright, directed upwardly, integrally at the front end portion of the shutter main body 112. The circular-arc-shaped guide wall portion 118 serves as a circular-arc-shaped guide portion which slides along the outer peripheral surface of the tubular wall 40 of the base plate portion 32 and which closes a portion (the cut-out portion of the front portion of the tubular wall 40) of the window portion 58 for a recording/playback head of the base plate portion 32. As seen in plan view, the inner peripheral surface of the circular-arc-shaped guide wall portion 118 is formed to curve in a circular-arc shape corresponding the outer peripheral surface of the tubular wall 40. The height of the circular-arc-shaped guide wall portion 118 is determined such that the heightwise level of the top end portion in the assembled state corresponds to the top end surface of the tubular wall 40 (see FIG. 8A).

At the circular-arc-shaped guide wall portion 118, a jutting-out portion 118A, which juts out toward the left of the shutter main body 112, is short, and a jutting-out portion 118B, which juts out toward the right, is long. A window portion 118C, whose bottom is cut-out in a substantial rectangular shape and open, is provided in the jutting-out portion 118B which juts out toward the right. The window portion 118C corresponds to the window portion 78 of the top surface plate portion 34. The dimensions of the respective portions are determined such that, in the state in which the opening 14 is open due to the shutter mechanism, this window portion 118C is positioned at the front.

The shutter pull-out portion 116, which serves as a connecting portion, is connected to a vicinity of the inner surface of the distal end portion of the jutting-out portion 118A which juts out to the left of the circular-arc-shaped guide wall portion 118. The shutter pull-out portion 116 is formed in a thin plate shape (e.g., a metal thin plate or the like) which is sufficiently thinner than the circular-arc-shaped guide wall portion 118 and which is elastically deformable in the thickness direction. The shutter engaging portion 114, which serves as an operation portion and which is formed in the shape of a small block, is mounted to the distal end portion of the shutter pull-out portion 116. As shown in FIG. 8B, the transverse dimensions, in the vertical direction, of the shutter pull-out portion 116 and the shutter engaging portion 114 correspond to the vertical dimension of the shutter guiding groove 96 and the vertical dimension of the first guide groove 12A, respectively. A small hole 116A is provided in the intermediate portion of the shutter pull-out portion 116, and is for engaging a lock claw 138 which will be described later.

Figure 4:
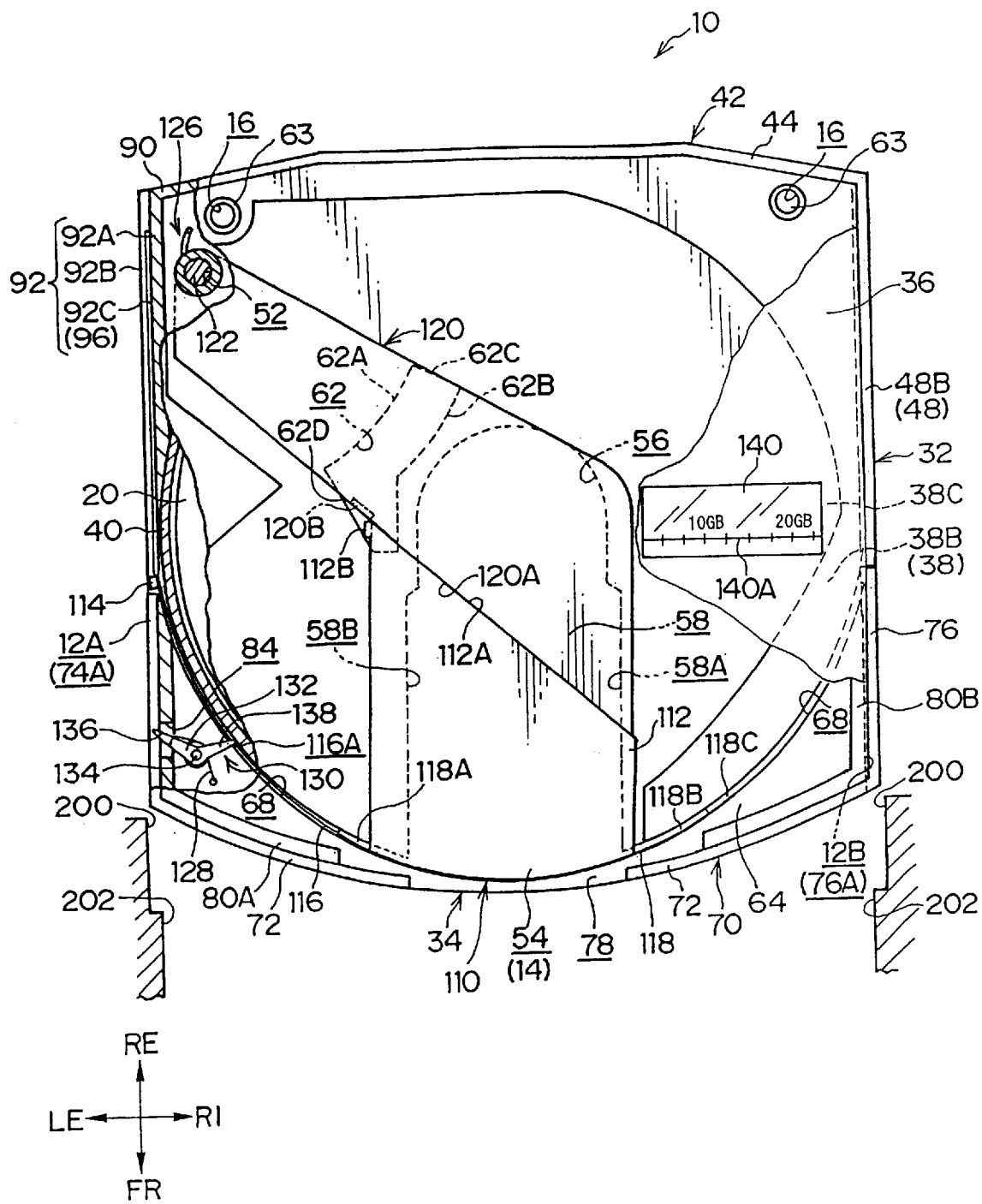
FIG. 4 is a bottom view, in which a bottom surface plate portion as well as a portion are cut-out, showing the entire structure, in a state in which an opening is closed, of the disc cartridge relating to the present invention.
Figure 8A:
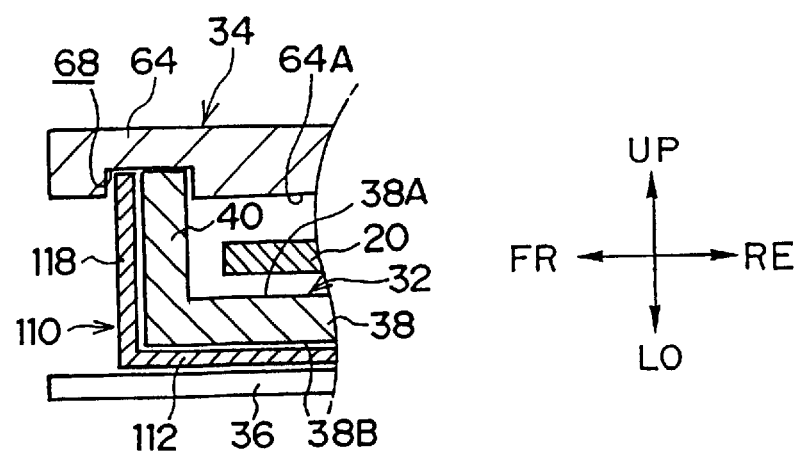
FIG. 8A is a cross-sectional view showing the structure of a front end portion of the disc cartridge relating to the present invention.
Figure 8B:
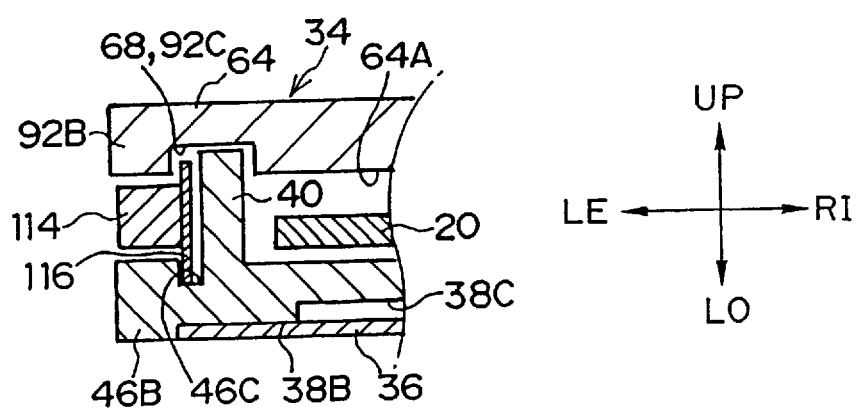
FIG. 8B is a cross-sectional view showing the structure of a left wall portion of the disc cartridge relating to the present invention.

Further, as shown in FIGS. 4 and 8A, in a state in which the circular-arc-shaped guide wall portion 118 is, together with the tubular wall 40 of the base plate portion 32, inserted into the annular groove 68 of the top surface plate portion 34 and is disposed slidably along the outer peripheral portion of the tubular wall 40, the shutter main body 112 of the first shutter member 110 is disposed between the concave portion 38C of the base plate portion 32 and the top surface of the bottom surface plate portion 36, and usually, a portion of the opening 14 (mainly, the window portion 58 for a recording/playback head) is closed.

In this state, the presser piece 112B of the shutter main body 112 is inserted into the shutter guiding hole 62 of the base plate portion 32, and is positioned at the front thereof. Further, in this state, the distal end portion of the shutter pull-out portion 116 is positioned at the front end portion of the shutter guiding groove 96 which communicates with the annular groove 68 of the top surface plate portion 34, and the shutter engaging portion 114 is positioned at the substantially central portion within the first guide groove 12A (at the rear of the left wall 74 of the top surface plate portion 34) and is exposed to the exterior. In this way, by moving the shutter engaging portion 114 rearward from the exterior, the circular-arc-shaped guide wall portion 118 is slid along the outer peripheral surface of the tubular wall 40 via the shutter pull-out portion 116, and the shutter main body 112 is rotated (see FIGS. 4 through 7).

Further, the shutter mechanism is provided with a locking means 130 for regulating the rotation of the first shutter member 110. The locking means 130 is provided with the lock lever 132 which is substantially V-shaped in plan view. The lock lever 132 is formed by a supporting shaft 134, the lock releasing lever 136, and the lock claw 138. The supporting shaft 134 which is positioned in a center portion is supported so as to be freely rotatable in the shaft hole 86A of the top surface plate portion 34. The lock releasing lever 136 is provided at one end portion of the lock lever 132, and projects from the lock releasing lever hole 84 into the first guide groove 12A (the lateral groove 74A). The lock claw 138 is provided at the other end portion of the lock lever 132 and can engage with the small hole 116A of the shutter pull-out portion 116.

One end portion of a torsion spring 128 is anchored on the lock lever 132, and the other end portion of the torsion spring 128 is inserted and held in the holding hole 86B of the top surface plate portion 34. In this way, the lock claw 138 is usually urged by the torsion spring 128 in the direction of engaging with the small hole 116A of the shutter pull-out portion 116, and the lock lever 132 usually maintains the closed state of the opening 14.

On the other hand, when the lock releasing lever 136 is pushed rearward, the lock lever 132 rotates around the supporting shaft 134 against the urging force of the torsion spring 128, and the engaged state of the lock claw 138 and the small hole 116A of the shutter pull-out portion 116 is cancelled.

Further, the shutter mechanism is provided with the second shutter member 120 which mainly closes the hub hole 56 of the base plate portion 32. The second shutter member 120 is formed by a resin member or a metal plate (e.g., stainless steel) or the like. As seen in plan view, the second shutter member 120 is formed by a thin flat plate which is substantially trapezoidal (a trapezoid in which the parallel segments positioned at the left and right are offset and the space between the parallel segments is long) The thickness of the second shutter member 120 is the same as that of the shutter main body 112 of the first shutter member 110.

The end surface of the inclined side portion of the front end of the second shutter member 120 is an abutment portion 120A which abuts the abutment portion 112A of the shutter main body 112 of the first shutter member 110. The pressed piece 120B stands upright, directed upwardly (into the case 30) at the position of the abutment portion 120A which position corresponds to the pressing piece 112B of the shutter main body 112. The pressed piece 120B corresponds to the circular-arc portion of the shutter guiding hole 62 of the base plate portion 32. The widthwise dimension of the pressed piece 120B is such that the pressed piece 120B always abuts the pressing piece 112B within the range of rotation of the shutter main body 112 (the range of movement of the pressing piece 112B which is regulated at the shutter guiding hole 62).

The second shutter member 120 is provided with a rotation shaft 122 which stands upright, directed upwardly, at the rear left end portion of the second shutter member 120. The rotation shaft 122 corresponds to the shutter shaft hole 52 of the base plate portion 32. A slit 124 is formed at the top end portion of the rotation shaft 122. Note that the second shutter member 120 may be formed such that the rotation shaft 122 is molded from a resin material or the like, and is fixed and held by fitting or adhesion or the like.

The second shutter member 120 is disposed between the concave portion 38C of the base plate portion 32 and the top surface of the bottom surface plate portion 36, in a state in which the rotation shaft 122 is inserted through the shutter shaft hole 52 of the base plate portion 32 and the pressed piece 120B is inserted in the shutter guiding hole 62. In this state, one end portion of the torsion spring 126 is anchored in the slit 124 of the rotation shaft 122, and the other end portion of the torsion spring 126 is anchored on the spring holding portion 53 of the base plate portion 32. The second shutter member 120 is thereby usually urged in a direction of abutting the first shutter member 110.

In this way, the abutment portion 120A of the second shutter member 120 usually is in a state of abutting the abutment portion 112A of the first shutter member 110, and in this state, the second shutter member 120 mainly closes the hub hole 56 of the base plate portion 32. Namely, as shown in FIG. 1B, the first shutter member 110 and the second shutter member 120 usually close the opening 14 of the disc cartridge 10, with the abutment portions 112A, 120A abutting each other.

In this state, the pressing piece 112B of the first shutter member 110 and the pressed piece 120B of the second shutter member 120 are respectively engaged with the inner edge of the front portion of the shutter guiding hole 62 of the base plate portion 32, and the state of abutment of the abutment portions 112A, 120A is maintained.

Next, to describe the operation of the disc cartridge 10, at the disc cartridge 10 having the above-described structure, at the time when the disc medium 20 is not being used, the opening 14 is closed by the first shutter member 110 and the second shutter member 120. Namely, as shown in FIG. 4, the abutment portion 112A of the first shutter member 110 and the abutment portion 120A of the second shutter member 120 match abut) one another. The first shutter member 110 mainly closes the window portion 58 for a recording/playback head of the base plate portion 32, and the second shutter member 120 mainly closes the hub hole 56 of the base plate portion 32.

At this time, due to the lock claw 138 of the locking means 130 engaging with the small hole 116A of the shutter pull-out portion 116, rotation of the first shutter member 110 in the direction of opening the opening 14 is regulated, and the aforementioned closed state is maintained. The second shutter member 120 is urged in the direction of abutting the first shutter member 110 by the torsion spring 126, and the aforementioned closed state is maintained. In this way, entry of dust into the disc cartridge 10 when the disc medium 20 is not in use, i.e., adhesion of dust onto the bottom surface 24 of the disc medium 20, is prevented.

When the disc medium 20 is to be used (when information is to be recorded onto the disc medium 20 or information recorded on the disc medium 20 is to be played back), the disc cartridge 10 is loaded into the drive device. When the disc cartridge 10 is loaded into the drive device, the disc cartridge 10 is inserted into an insertion opening 200 (see FIGS. 4 through 7) of the drive device, with the front end portion 10A of the disc cartridge 10 leading.

Accompanying this insertion, guiding convex portions 202 of the drive device are inserted into the first guide groove 12A and the second guide groove 12B of the disc cartridge 10. The guiding convex portion 202, which is inserted into the first guide groove 12A, moves relatively toward the rear of the first guide groove 12A as the disc cartridge 10 is inserted further, and abuts the lock releasing lever 136 positioned within the first guide groove 12A, and pushes the lock releasing lever 136 rearward.

Figure 5:
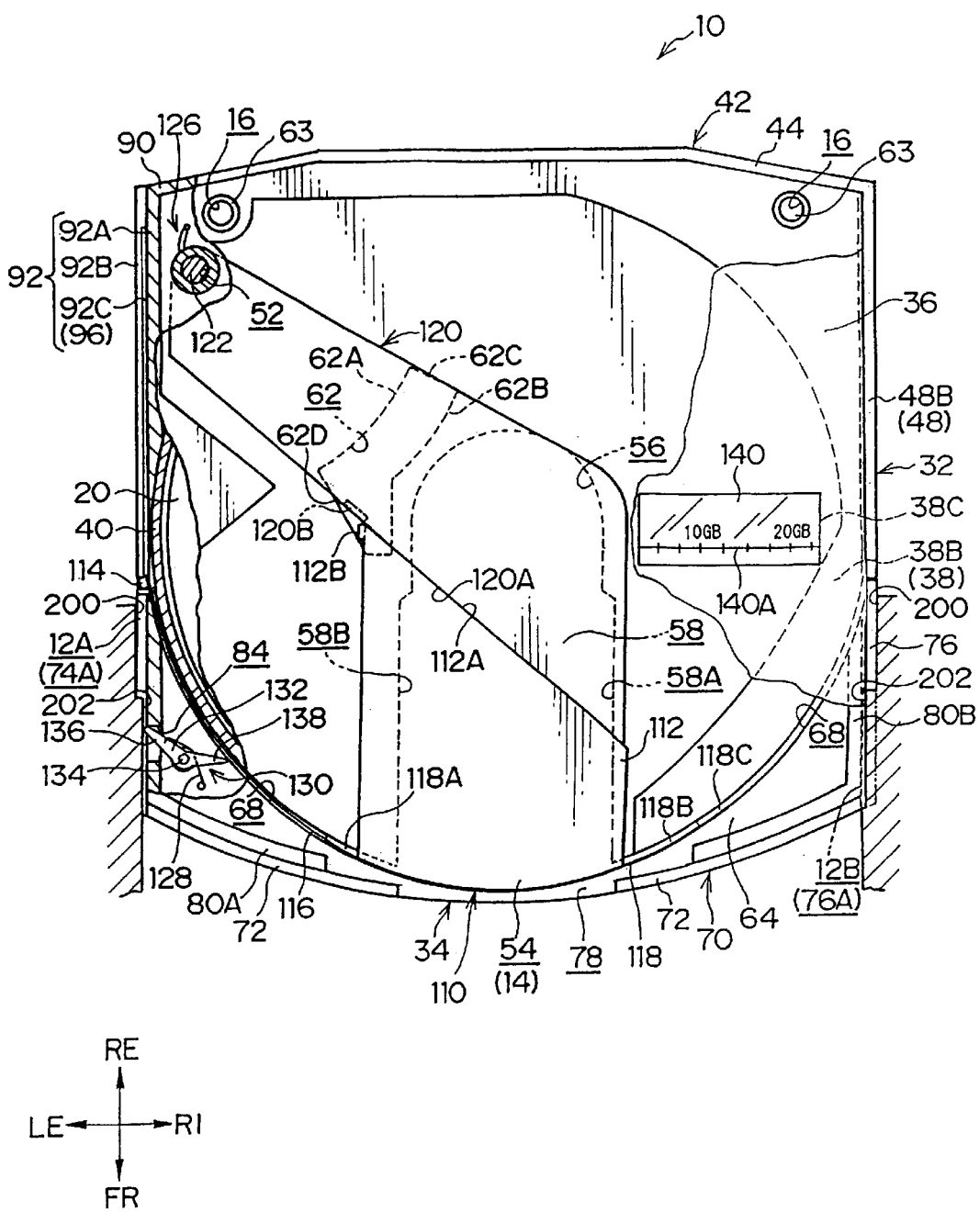
FIG. 5 is a view, corresponding to FIG. 4, showing a lock released state of the disc cartridge relating to the present invention.

When the lock releasing lever 136 is pushed rearward, as shown in FIG. 5, the lock lever 132 rotates around the supporting shaft 134 (the shaft hole 86A). The lock releasing lever 136 is withdrawn to within the lock releasing lever hole 84, and the engaged state of the lock claw 138 and the small hole 116A of the shutter pull-out portion 116 is cancelled. In this way, the locked state of the first shutter member 110 is cancelled, and the first shutter member 110 rotates freely.

Figure 6:
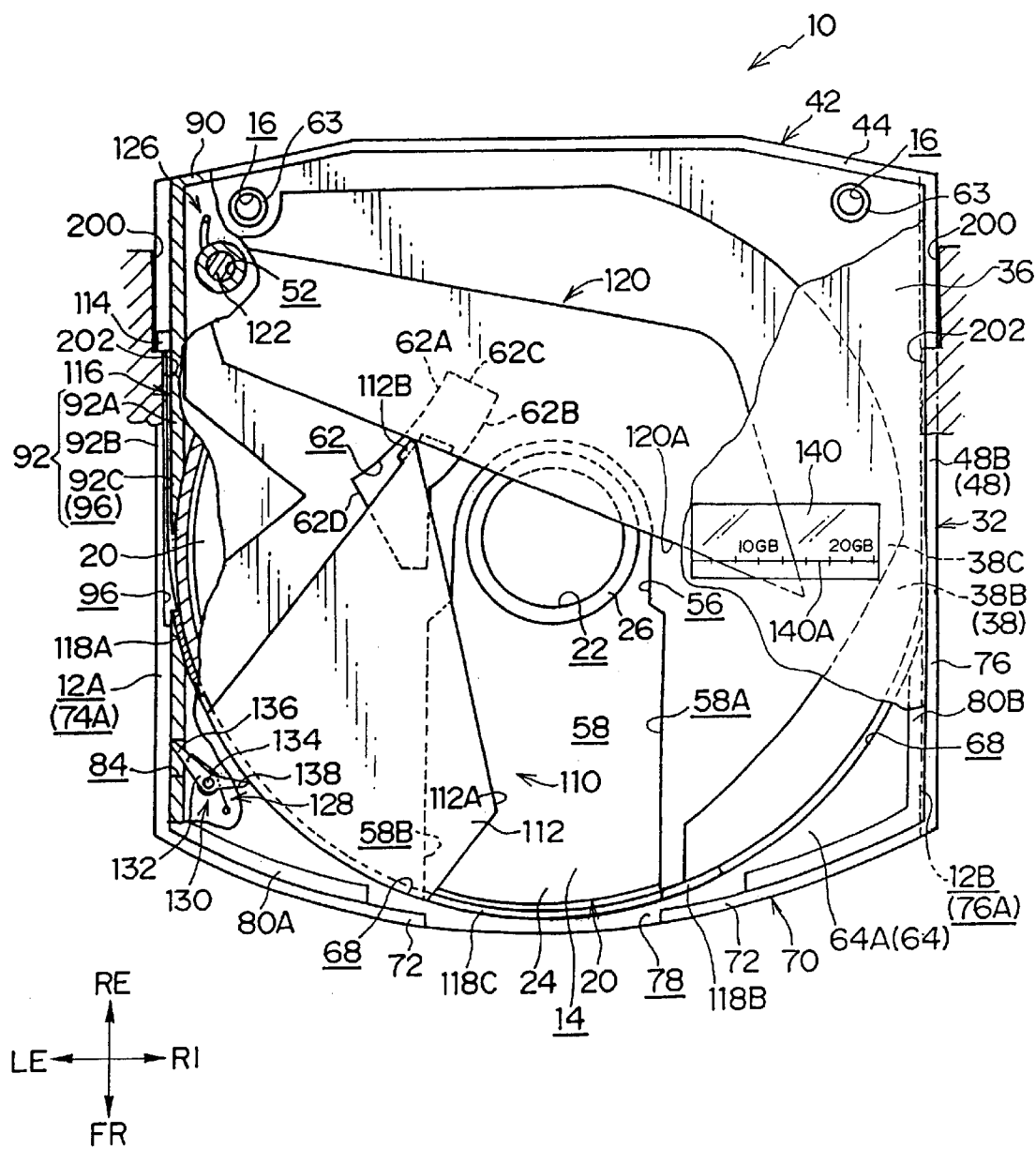
FIG. 6 is a view, corresponding to FIG. 4, showing a process of opening the opening of the disc cartridge relating to the present invention.

When the guiding convex portion 202 of the drive device moves relatively further rearward within the first guide groove 12A, while this guiding convex portion 202 maintains the above-described lock released state, the guiding convex portion 202 engages with the shutter engaging portion 114 positioned within the first guide groove 12A, and pushes the shutter engaging portion 114 rearward. When the shutter engaging portion 114 is pushed rearward, as shown in FIG. 6, the first shutter member 110, whose locked state has been cancelled, rotates.

Namely, as the shutter engaging portion 114 moves rearward, the shutter pull-out portion 116 moves rearward in the shutter guiding groove 96 which extends in a tangential direction of the tubular wall 40. The circular-arc-shaped guide wall portion 118 thereby rotates while sliding along the outer peripheral surface of the tubular wall 40. As the circular-arc-shaped guide wall portion 118 rotates, the shutter main body 112, which is integral therewith, rotates along the tubular wall 40 (around the axial center of the tubular wall 40).

Then, as the first shutter member 110 rotates, the pressing piece 112B of the shutter main body 112 moves substantially rearward within the shutter guiding hole 62. Namely, the pressing piece 112B, which is provided so as to be separated from the axial center of the tubular wall 40, rotates around the axial center of the tubular wall 40. When the pressing piece 112B moves substantially rearward, the pressed piece 120B of the second shutter member 120, which is disposed so as to abut the pressing piece 112B, moves along the circular-arc-shaped portion of the shutter guiding hole 62 while being pressed substantially rearward. As the pressed piece 120B moves, the second shutter member 120 rotates around the rotation shaft 122 in a direction of moving away from the first shutter member 110 against the urging force of the torsion spring 126.

Figure 7:
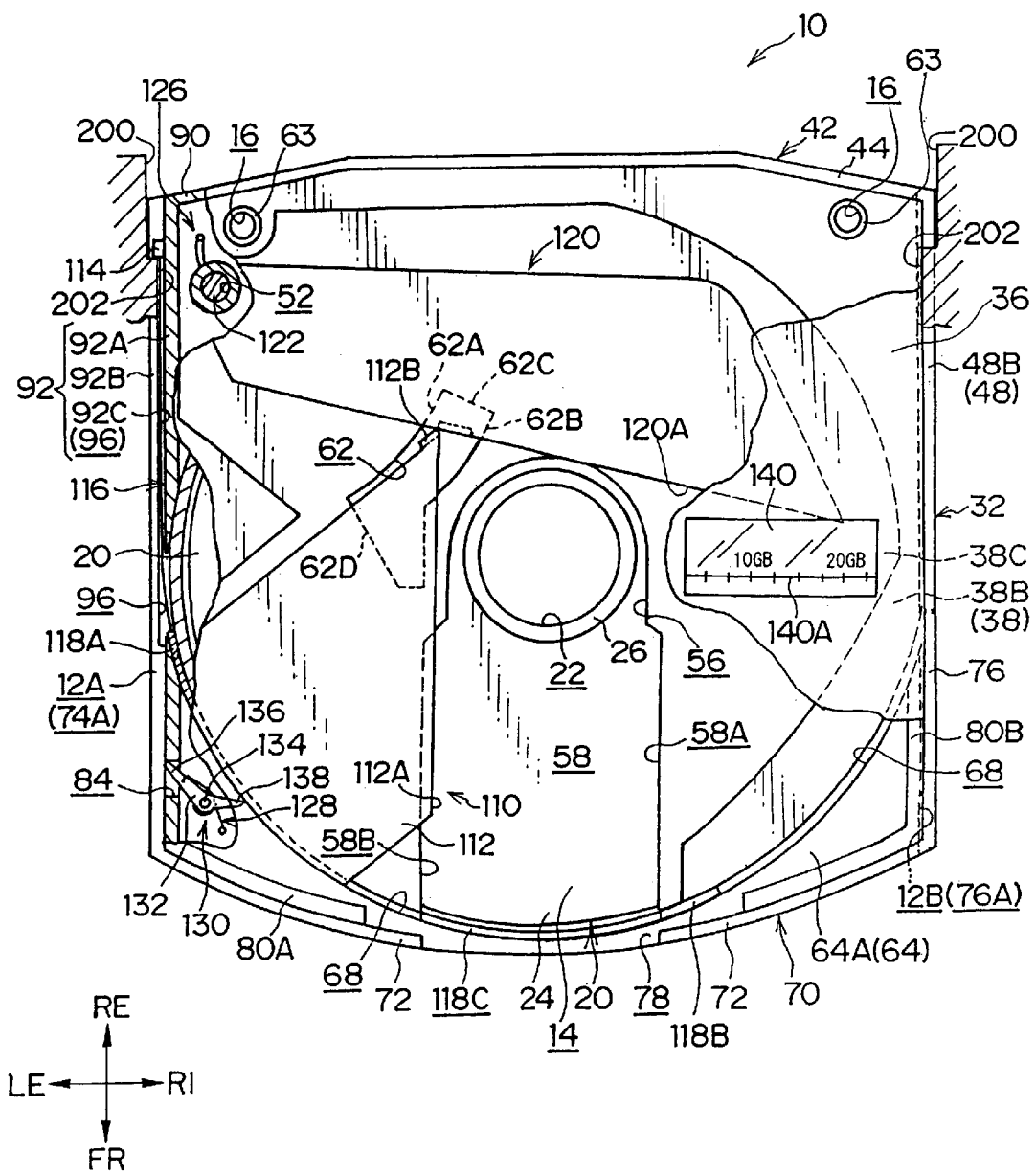
FIG. 7 is a view, corresponding to FIG. 4, showing an open state of the opening of the disc cartridge relating to the present invention.

When the guiding convex portion 202 of the drive device moves relatively and further rearward within the first guide groove 12A while engaging with the shutter engaging portion 114 (while pushing the shutter engaging portion 114 rearward), as shown in FIG. 7, the first shutter member 110 (the shutter main body 112 and the circular-arc-shaped guide wall portion 118) and the second shutter member 120 rotate further, and the window portion 58 for a recording/playback head and the hub hole 56 are opened. In this state, the window portion 118C of the circular-arc-shaped guide wall portion 118 is positioned at the front portion of the disc cartridge 10, and the front of the window portion 58 for a recording/playback head also is open through the window portion 78 of the top surface plate portion 34. Namely, the opening 14 of the disc cartridge 10 is opened.

As described above, due to the first shutter member 110 and the second shutter member 120 moving (rotating) in respectively different directions while the abutment portions 112A, 120A thereof move away from each other, the large opening 14 of the disc cartridge 10 can be opened while the area over which the shutters move is small.

Further, when the disc cartridge 10 is inserted to a predetermined position of the drive device, the positioning mechanism of the drive device is inserted into the holes 16 for position regulation, and the disc cartridge 10 is accurately positioned. In this way, the disc cartridge 10 cannot be inserted any further, and closing of the opening 14 due to the urging force of the torsion spring 126 and movement in the direction of discharging the disc cartridge 10 (movement toward the insertion opening 200 side) are prevented.

In this state, the rotation spindle shaft is inserted from a portion corresponding to the hub hole 56 of the opening 14 whose closed state has been canceled. At the distal end portion of the rotation spindle shaft, the rotation spindle shaft holds the center core portion 26 of the disc medium 20 by engagement or suction or the like, and rotates the disc medium 20 around the axial center. Further, a recording/playback head is inserted from a portion corresponding to the window portion 58 for a recording/playback head of the opening 14. Information is recorded onto the recording surface of the disc medium 20 or information recorded on the recording surface is played back.

On the other hand, when the disc cartridge 10 is to be discharged from the drive device, the positioning mechanism is removed from the holes 16 for position regulation, and movement in the discharging direction (movement toward the insertion opening 200 side) becomes possible. In this state, due to the urging force of the torsion spring 126 or the discharging direction pressing force applied by the drive device, the disc cartridge 10 is moved with the rear end portion 10B thereof leading. Accompanying this movement, while the guiding convex portion 202 of the drive device is engaged with the shutter engaging portion 114, the pressing force via this guiding convex portion 202 is no longer applied, and the first shutter member 110 is set in a state in which rotation is possible.

In this state, while the disc cartridge 10 moves in the discharging direction as described above, the opening 14 is closed. Namely, due to the urging force of the torsion spring 126, the second shutter member 120 rotates in the direction of closing the opening 14 while, at the pressed piece 120B, pressing the pressing piece 112B of the first shutter member 110 substantially forward. Further, the first shutter member 110 which is pressed substantially forward at the pressing piece 112B rotates in the direction of closing the opening 14 due to this pressing.

When the first shutter member 110 and the second shutter member 120 respectively rotate and return to their initial positions, the opening 14 is closed. The pressing piece 112B of the first shutter member 110 which has returned to its initial position engages with the inner edge of the front portion of the shutter guiding hole 62. Further rotation, due to the urging force of the torsion spring 126, of the first shutter member 110 and the second shutter member 120, which abuts the pressing piece 112B at the pressed piece 120B, is prevented.

Rotation of the first shutter member 110 and the second shutter member 120 past their initial positions may be prevented by the pressed piece 120B of the second shutter member 120 being made to engage the peripheral edge portion of the shutter guiding hole 62 at the initial position. Or, rotation may be prevented by the distal end portion of the jutting-out portion 118B of the circular-arc-shaped guide wall portion 118 of the first shutter member 110 being made to engage the widened end portion of the annular groove 68 at the initial position.

When the disc cartridge 10 is moved further in the discharging direction and the guiding convex portion 202 is moved to a position further forward than the lock releasing lever hole 84 of the first guide groove 12A, due to the urging force of the torsion spring 128, the lock lever 132 rotates. The lock releasing lever 136 projects into the first guide groove 12A, and the lock claw 138 engages with the small hole 116A of the shutter pull-out portion 116 of the first shutter member 110. In this way, the disc cartridge 10 returns to the state before loading into the drive device, rotation of the first shutter member 110 is prevented, and the closed state of the opening 14 is maintained.

Next, the structure for easily visually recognizing the recorded/unrecorded regions of information at the recording surface of the disc medium 20 of the disc cartridge 10 described above will be explained. Only the bottom surface of the disc medium 20 shown in the present embodiment is a recording surface. Thus, at the base plate portion 32, a rectangular, transparent mirror portion 142 is provided at a region other than the region of the first shutter member 110 and the second shutter member 120 when the opening 14 is closed (e.g., at the right side of the window portion 58 for a recording/playback head shown in the figures), substantially radially so as to substantially correspond to the length at the recording surface of the disc medium 20 from the inner periphery to the outer periphery. Further, a transparent window portion 140, which is substantially equivalent to the window portion 142, is provided at a region of the bottom surface plate portion 36 which region opposes the window portion 142.

When these window portions 142, 140 are provided, because the recording region is formed at the disc medium 20 at the recording surface thereof from the inner periphery to the outer periphery, when the disc cartridge 10 is not in use, the recorded/unrecorded regions of the disc medium 20 can be easily visually confirmed from the exterior, and the approximate unrecorded amount can be suitably recognized. Accordingly, as compared with the conventional art, the convenience of use of the disc cartridge 10 can be improved.

In particular, if an identifying means which allows concrete recognition of the recorded amount or the unrecorded amount, e.g., a scale 140A as shown in the figures, is provided at the window portion 140 of the bottom surface plate portion 36 (or at the window portion 142 of the base plate portion 32), by merely reading the scale 140A, the recorded amount or the unrecorded amount of the disc medium 20 can be accurately grasped, which is even more effective and preferable.

Figure 9:
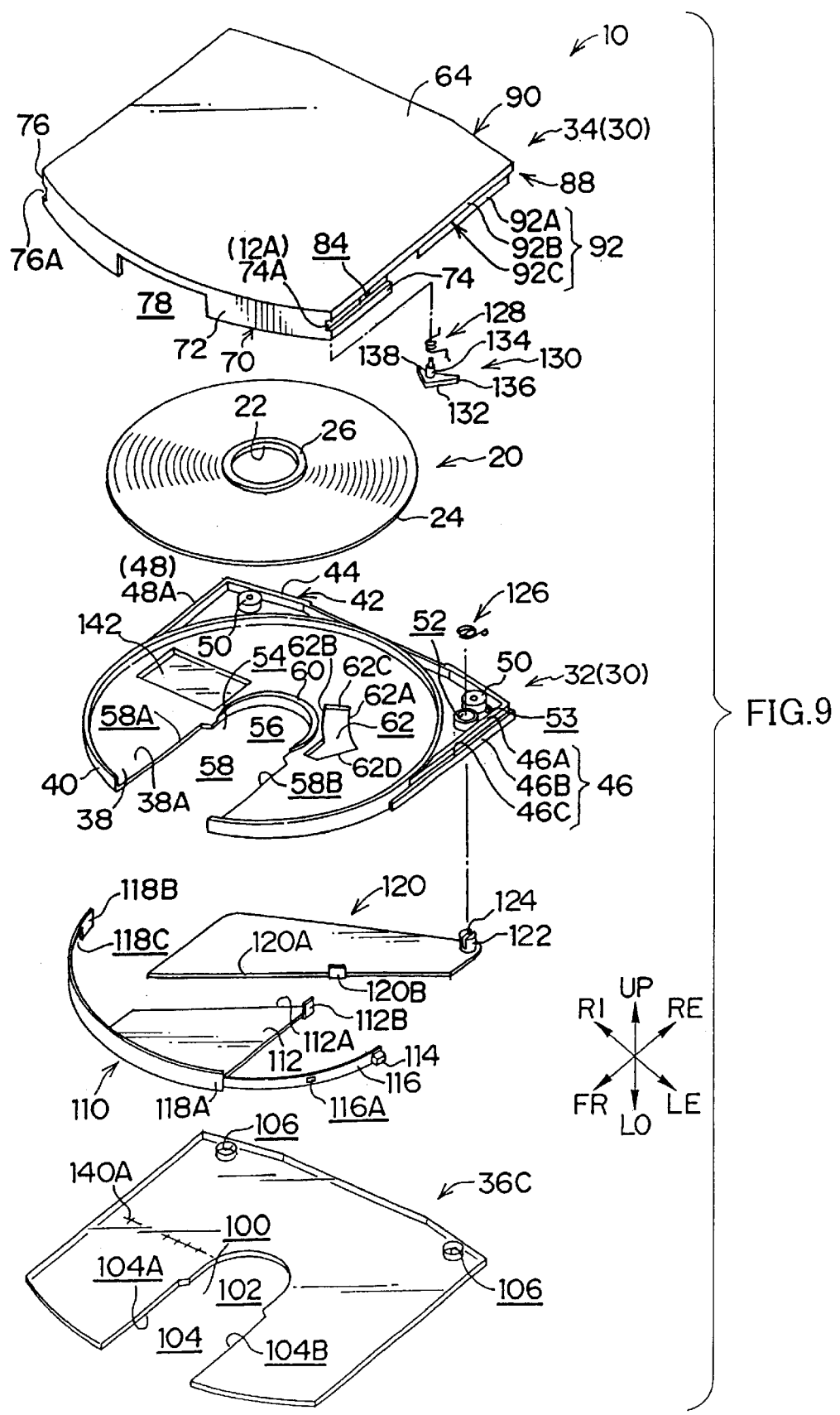
FIG. 9 is an exploded perspective view, as seen from above at an angle, of a disc cartridge of another embodiment relating to the present invention.
Figure 10:
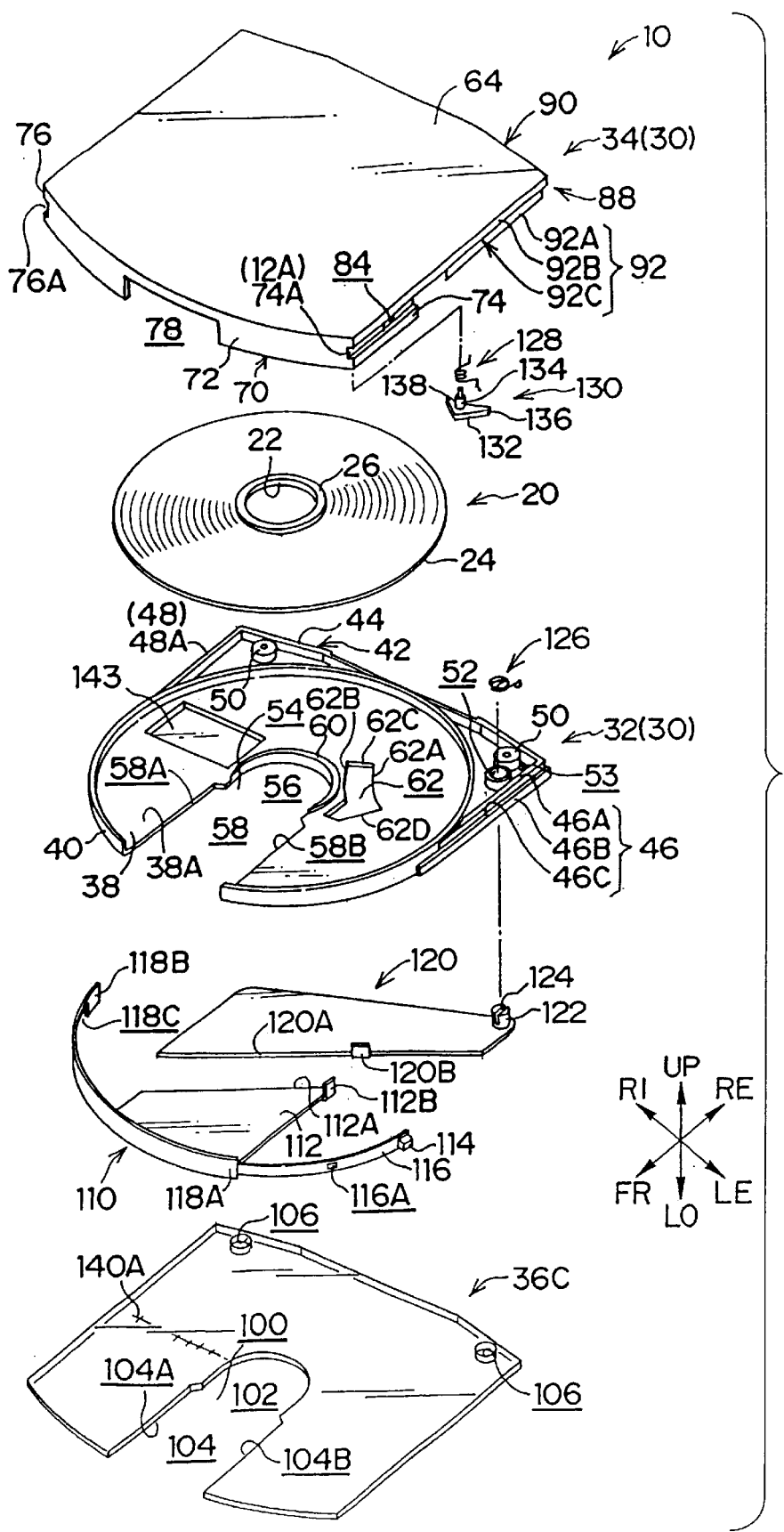
FIG. 10 is an exploded perspective view, viewed from above at an angle, of a disc cartridge of another embodiment relating to the present invention.

It goes without saying that similar effects can be achieved by not providing the window portion 140 at the bottom surface plate portion 36, and by, as shown in FIG. 9, providing the scale 140A and making the bottom surface plate portion 36 be a bottom surface plate portion 36C formed completely by a transparent member. Further, when the bottom surface plate portion 36 is the bottom surface plate portion 36C which is formed completely by a transparent member, it suffices to not provide the window portion 142 at the base plate portion 32, and as shown in FIG. 10, to provide an aperture 143 or a cut-out portion (not shown) which is substantially the same shape as the window portion 142. In this way as well, similar effects can be obtained. Moreover, in this case, there is the advantage that the costs of manufacturing the base plate portion 32 can be reduced.

In order to increase the recording capacity of the disc medium 20, laser beam of a short wavelength (e.g., a blue-violet color laser) is illuminated onto the recording surface. Accordingly, when the above-described transparent window portions 140, 142 are provided or the bottom surface plate portion 36 is formed by the bottom surface plate portion 36C which is formed by a transparent member, in a case in which, for example, the disc cartridge 10 is stored for a long period of time, ultraviolet light may enter in from these transparent window portions or the like, and the recording surface of the disc medium 20 may deteriorate.

Thus, the transparent window portions 140, 142 or the transparent bottom surface plate portion 36C must be made of a substance which attenuates transmission of neighboring wavelengths including the recording wavelength of the disc medium 20 (for example, a substance whose main component is AL203 or the like) (i.e., so-called UV-cutting processing must be carried out). In this way, the deteriorating effects of ultraviolet light on the recording surface of the disc medium 20 can be prevented. Note that, other than such a structure, it is possible to apply a substance which can cut ultraviolet light onto at least the surfaces of the transparent windows 140, 142 or the transparent bottom surface plate portion 36C, or to, before molding, knead-in a substance which can cut ultraviolet light.

Figure 11A:
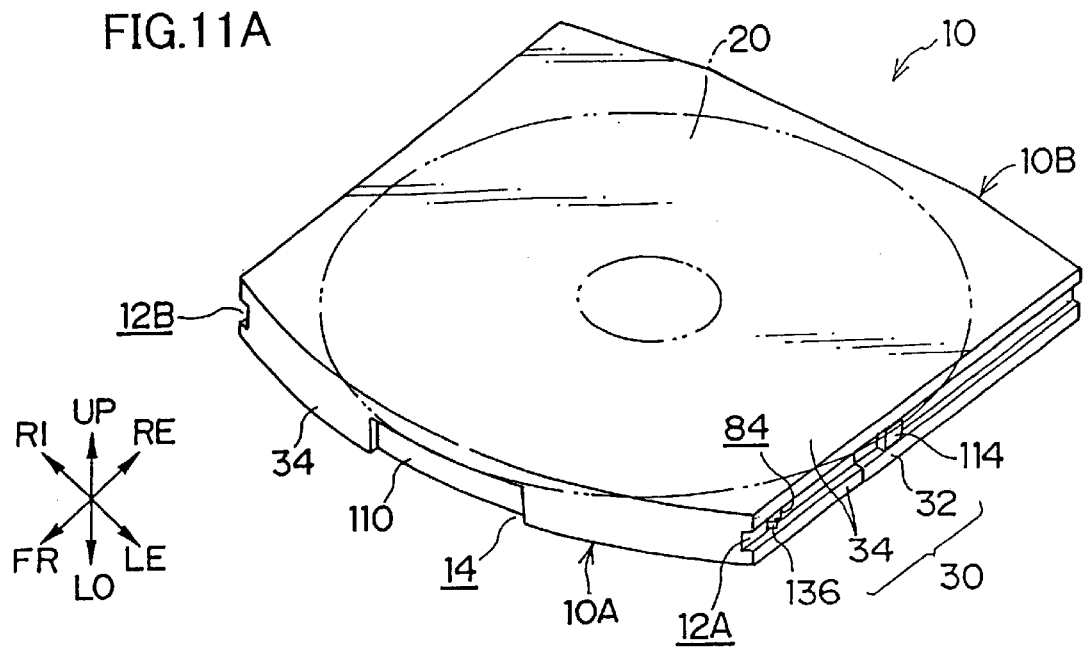
FIG. 11A is a perspective view, as seen from the front and above at an angle, of the disc cartridge relating to the present invention.
Figure 11B:
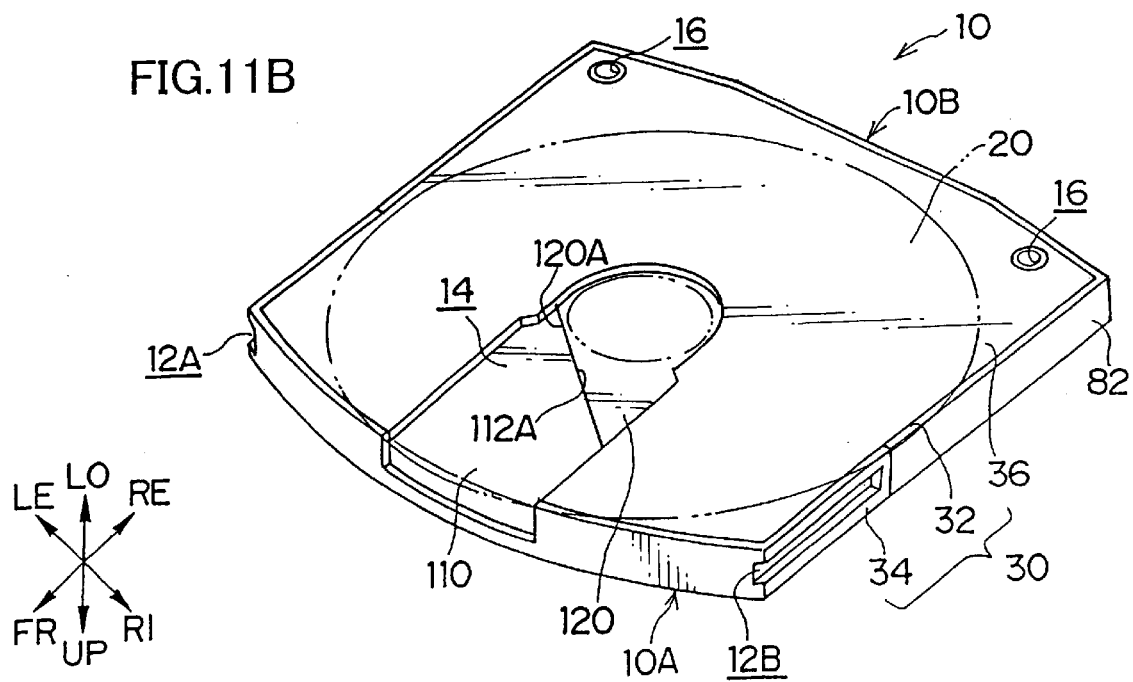
FIG. 11B is a perspective view, as seen from the front and below at an angle, of the disc cartridge relating to the present invention.

Next, the disc cartridge 10, in which movement of the first shutter member 110 and the second shutter member 120 is made smooth, will be described on the basis of FIGS. 11 through 18. Note that portions which are the same as those of the above-described embodiment are denoted by the same reference numerals, and description thereof is omitted. As shown in FIG. 11, the first guide groove 12A is formed over the entire front-back direction length of the disc cartridge 10, and the second guide groove 12B is provided only at the front portion of the right side surface of the disc cartridge 10.

Figure 12:
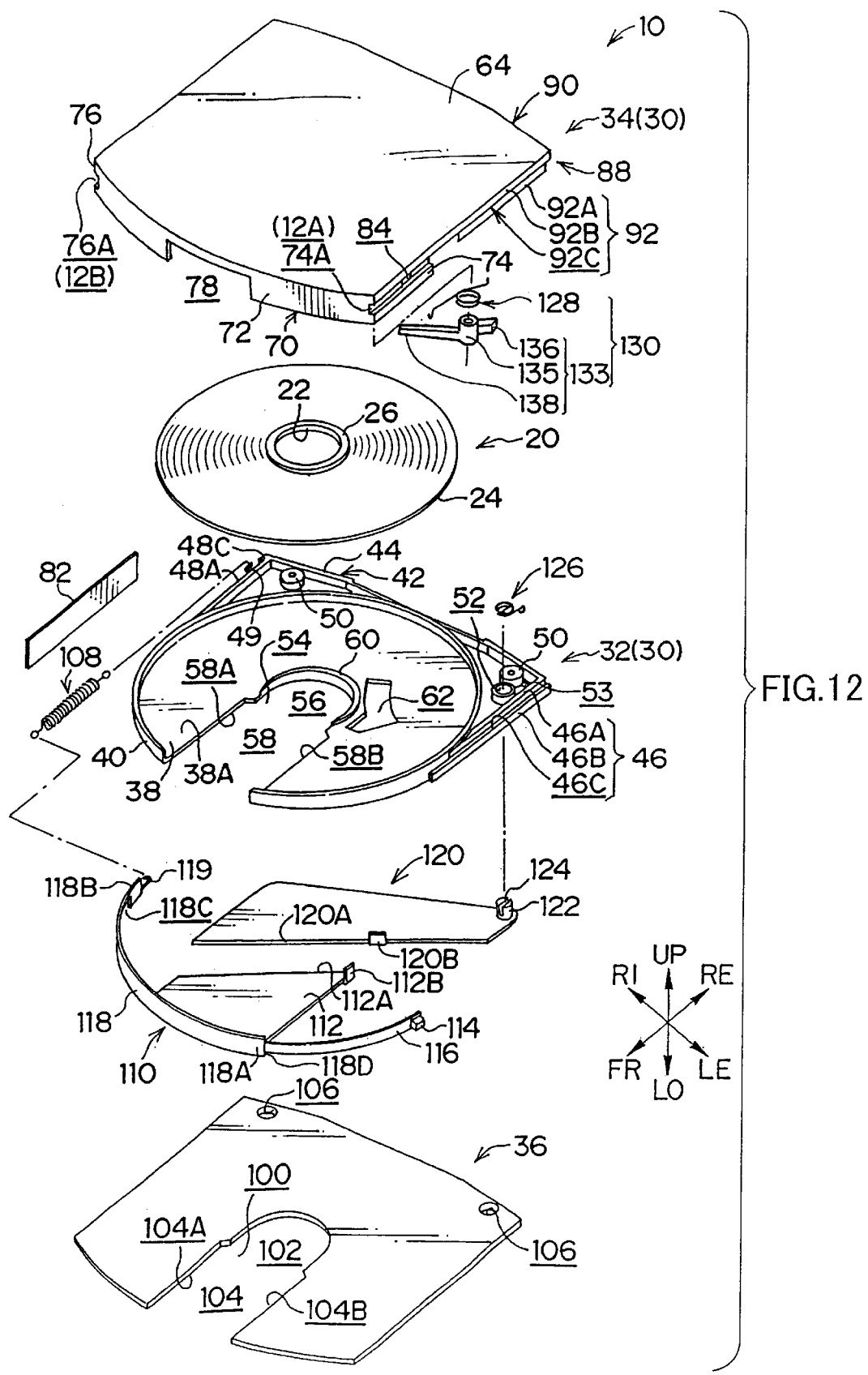
FIG. 12 is an exploded perspective view, as seen from above at an angle, of the disc cartridge relating to the present invention.
Figure 13:
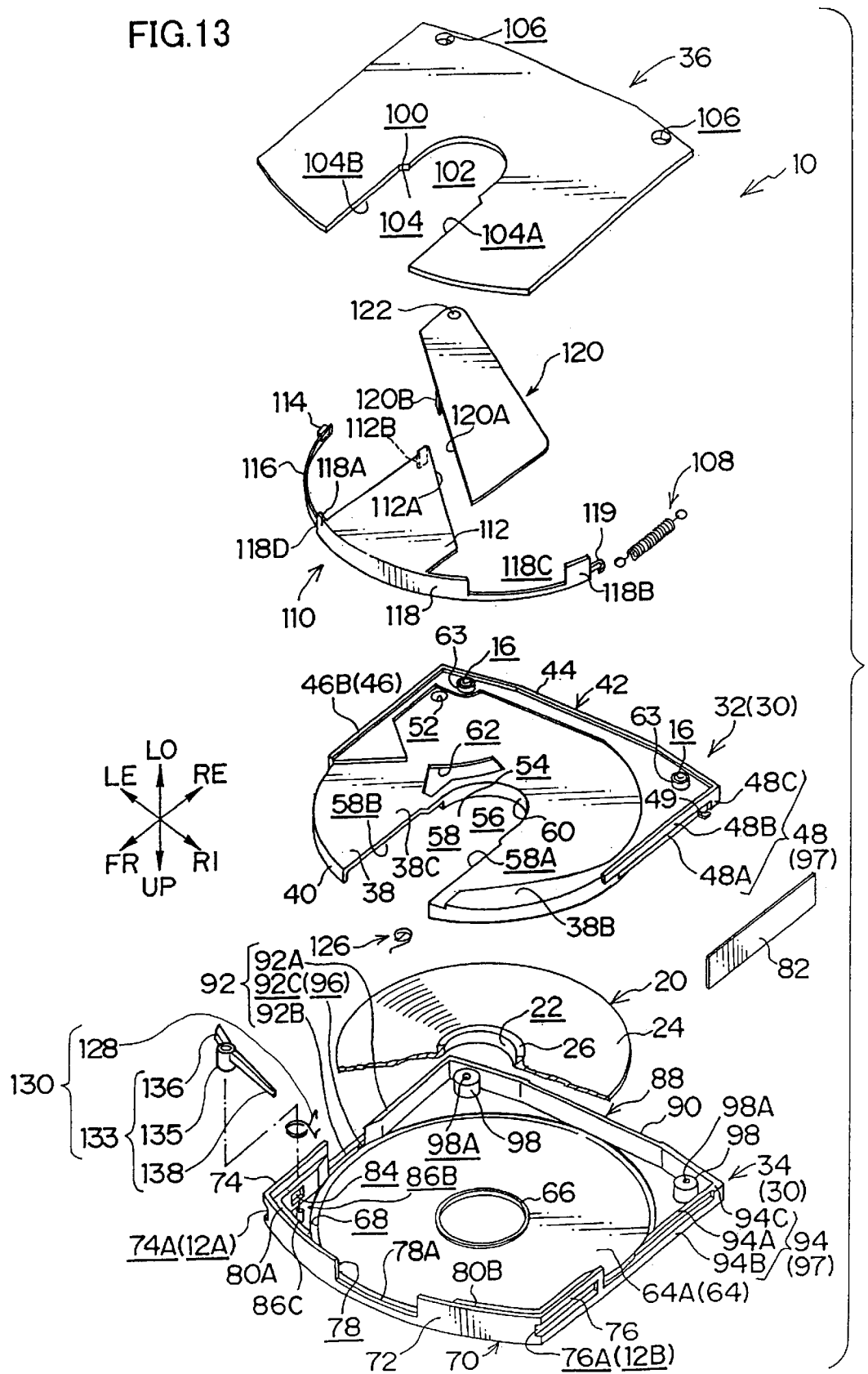
FIG. 13 is an exploded perspective view, as seen from below at an angle, of the disc cartridge relating to the present invention.
Figure 14:
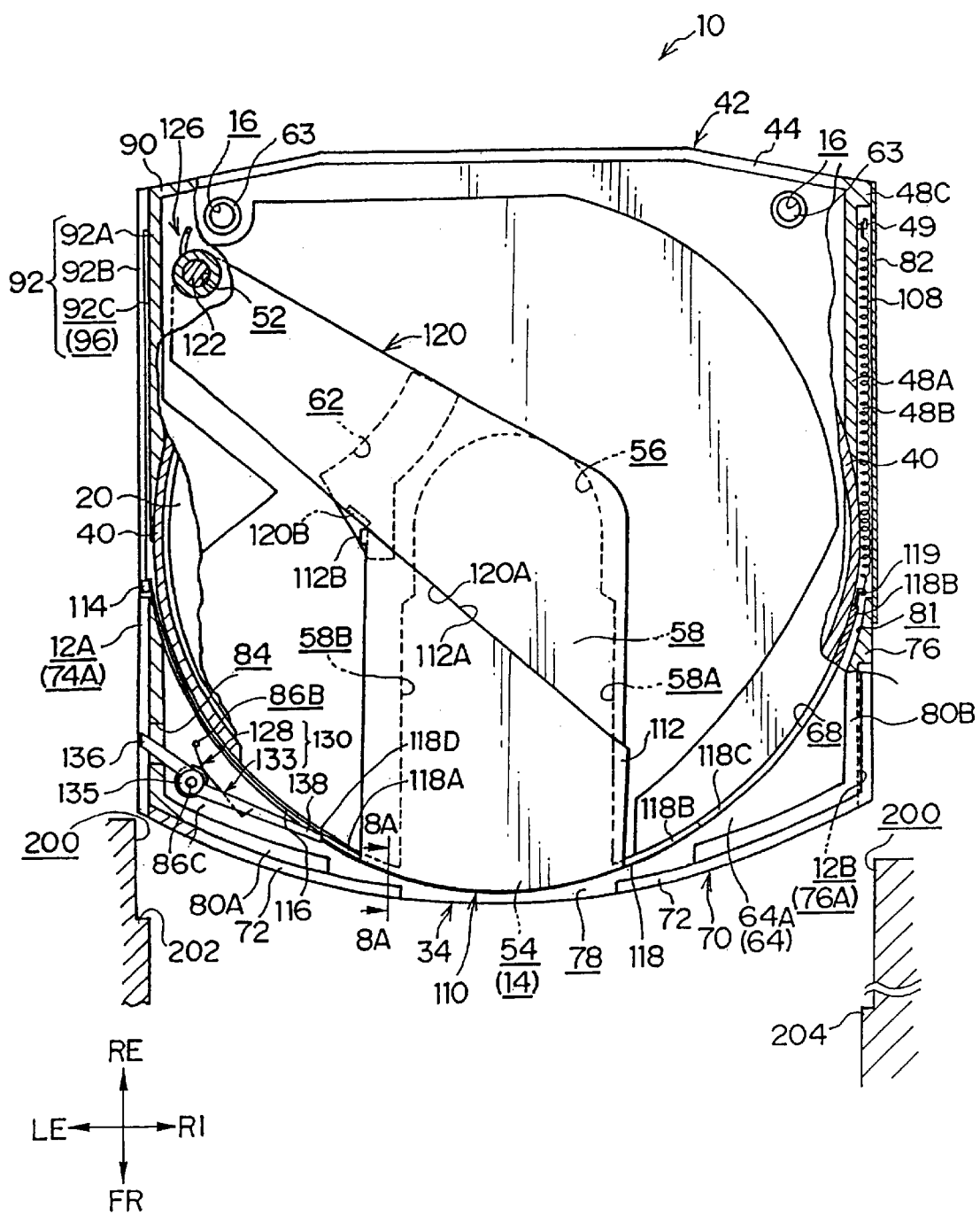
FIG. 14 is a bottom view, in which the bottom surface plate portion is removed and a portion is cut-out, showing the entire structure, in a state in which the opening is closed, of the disc cartridge relating to the present invention.
Figure 16:
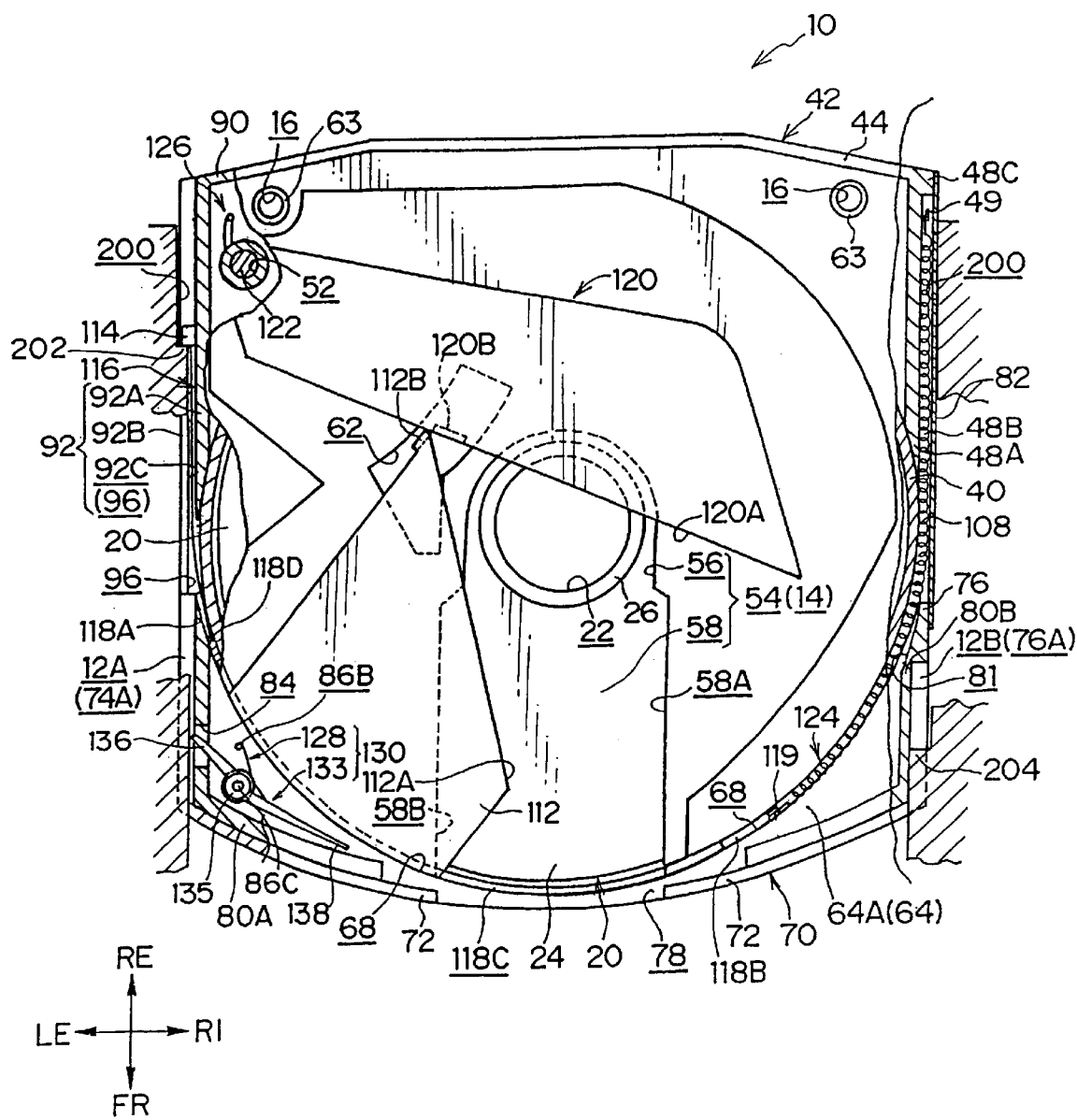
FIG. 16 is a view, corresponding to FIG. 14, showing a process of opening the opening of the disc cartridge relating to the present invention.
Figure 17:
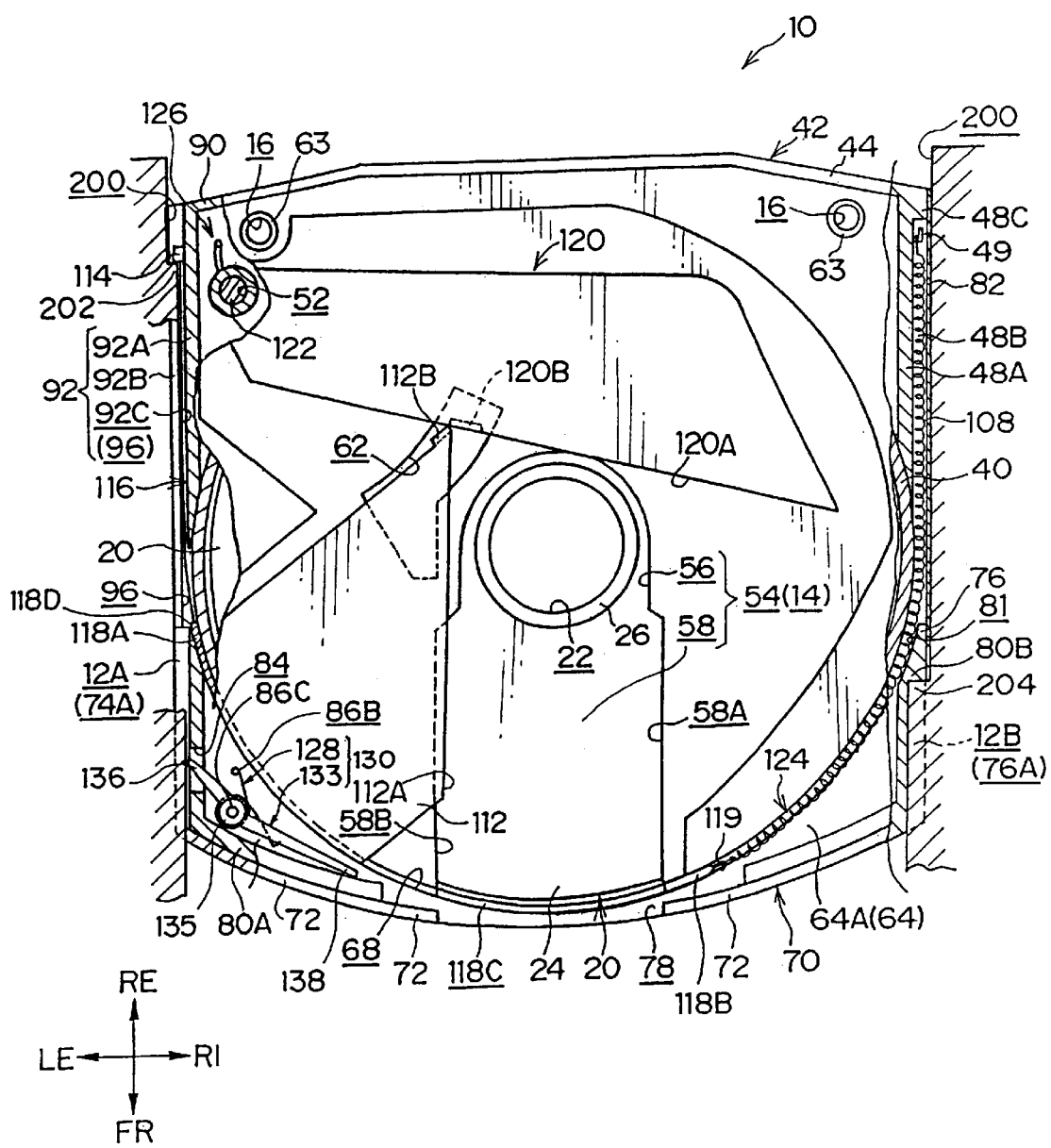
FIG. 17 is a view, corresponding to FIG. 14, showing an open state of the opening of the disc cartridge relating to the present invention.

Namely, as shown in FIGS. 12 and 13, the rear end portion of the right wall 76 of the top surface plate portion 34 is sealed, and the lateral groove 76A whose bottom portion reaches the inner wall 80B is formed in the right wall 76. This forms the second guide groove 12B. Further, at the right wall 48 of the base plate portion 32, a step portion 48C, whose top end surface is at the same heightwise level as the right inner wall 48A, is provided in a vicinity of the rear end portion of the right outer wall 48B.

A hook-shaped spring receiving hook 49 is provided at the right side surface of the right inner wall 48A at the front of the step portion 48C, and is used for anchoring one end portion of a coil spring 108 which serves as a first urging means. The outer surface (the right side surface) of the right inner wall 48A, the top end surface of the right outer wall 48B, and the front end surface of the step portion 48C form the inner surfaces of a groove-shaped coil spring chamber 97.

Namely, the right inner wall 94A and a step portion 94C of the top surface plate portion 34 abut the right inner wall 48A and the step portion 48C of the base plate portion 32, respectively. The right outer wall 94B of the top surface plate portion 34 opposes the right outer wall 48B of the base plate portion 32 such that the groove-shaped coil spring chamber 97 is formed. The coil spring chamber 97 is covered by a thin-plate-shaped cover 82 which is fixed by adhesion or the like to the right side surface of the case 30 (the respective outer surfaces of the right outer wall 48B and the step portion 48C of the base plate portion 32, and the rear portion of the right wall 76, the right outer wall 94B and the step portion 94C of the top surface plate portion 34).

As shown in FIGS. 14 through 17, the rear end portion of the inner wall 80B of the top surface plate portion 34 is formed coaxially with the annular groove 68 and along a circular arc of a larger diameter than the annular groove 68. A coil spring path 81 is formed between the inner wall 80B and the tubular wall 40 which is inserted in the annular groove 68. The coil spring path 81 communicates with the coil spring chamber 97, and permits expansion and contraction of the coil spring 108. Further, a hook-shaped spring receiving hook 119 is provided at the distal end portion of the jutting-out portion 118B of the circular-arc-shaped guide wall portion 118, and is for anchoring one end portion of the coil spring 108.

The distal end portion of the jutting-out portion 118B of the circular-arc-shaped guide wall portion 118 is positioned within the coil spring path 81. One end portion of the coil spring 108 is anchored on (connected to) the spring receiving hook 119. The other end portion of the coil spring 108 is anchored on (connected to) the spring receiving hook 49 of the base plate portion 32. The coil spring 108 is accommodated within the coil spring chamber 97 of the case 30.

A portion further toward the outer surface side than the connecting position of the shutter pull-out portion 116 and the left end portion of the jutting-out portion 118A of the circular-arc-shaped guide wall portion 118, is a lock engaging portion 118D which is engageable with the lock claw 138. A tubular shaft 135, which is rotatably supported by a supporting shaft 86C which projects at the top surface plate portion 34, is provided at the central portion of a lock lever 133 which is shown in FIGS. 11 through 18. The lock claw 138 is urged by the torsion spring 128 in the direction of engaging with the lock engaging portion 118D so as to engage with the lock engaging portion 118D and not the small hole 116A.

Accordingly, due to the lock engaging portion 118D being anchored on the lock claw 138, rotation of the first shutter member 110 in the direction of opening the opening 14 is regulated, and the closed state of the opening 14 is usually maintained. Then, by the guiding convex portion 202 of the drive device being inserted into the first guide groove 12A, the lock releasing lever 136 being pressed rearward, and the lock lever 133 being rotated around the tubular shaft 135 against the urging force of the torsion spring 128, the engaged state of the lock claw 138 and the lock engaging portion 118D is cancelled.

Here, to describe the operation of the first shutter member, the first shutter member 110 is usually urged in the direction of rotating along the tubular wall 40 with the jutting-out portion 118B leading, by the coil spring 108 which is expandable and contractable along the coil spring chamber 97 and the tubular wall 40. In the state in which the pressing piece 112B is engaged with the vicinity of the front end portion of the shutter guiding hole 62 and rotation is prevented, the first shutter member 110 closes a portion of the opening 14 (mainly the window portion 58 for a recording/playback head).

Then, by loading the disc cartridge 10 into the drive device, the guiding convex portion 202 engages with the shutter engaging portion 114. When the shutter engaging portion 114 is moved rearward, the circular-arc-shaped guide wall portion 118 is slid along the outer peripheral surface of the tubular wall 40 via the shutter pull-out portion 116 against the urging force of the coil spring 108, and the shutter main body 112 rotates (see FIGS. 14 through 17). At this time, the coil spring 108 expands along the coil spring chamber 97 and the tubular wall 40, and one end portion thereof follows the jutting-out portion 118B (the spring receiving hook 119) of the circular-arc-shaped guide wall portion 118 through the coil spring path 81.

Further, after insertion of the guiding convex portion 202 into the first guide groove 12A, a guiding convex portion 204 enters into the second guide groove 12B. When the guiding convex portion 204 is inserted to a position (a predetermined position of the drive device) at which the guiding convex portion 204 engages with the rear end portion of the second guide groove 12B, the positioning mechanism of the drive device is inserted into the holes 16 for position regulation, and accurate positioning is carried out. In this way, further insertion of the disc cartridge 10 is not possible, and closing of the opening 14 due to the urging forces of the coil spring 108 and the torsion spring 126, and movement in the discharging direction (toward the insertion opening 200 side) of the disc cartridge 10 are prevented.

When the disc cartridge 10 is discharged from the drive device, the disc cartridge 10 is moved, with the rear end portion 10B thereof leading, by the urging forces of the coil spring 108 and the torsion spring 126 or by the discharging direction pressing force applied by the drive device. Namely, at the first shutter member 110, moving force (pulling force or pressing force) applied from the exterior (by the guiding convex portion 202) is eliminated. Thus, the first shutter member 110 is rotated in the direction of closing the opening 14 while the circular-arc-shaped guide wall portion 118 moves along the tubular wall 40 due to the peripheral direction urging force of the coil spring 108 which contracts along the tubular wall 40.

In this way, because the first shutter member 110 is urged by the coil spring 108 which expands and contracts along the tubular wall 40, urging force along the peripheral direction of the tubular wall 40 can be suitably applied, by a simple structure, to the first shutter member which is not provided with a rotation shaft. Further, one end portion of the coil spring 108 is connected to the circular-arc-shaped guide wall portion 118 (the spring receiving hook 119 of the jutting-out portion 118B) which can apply the maximum rotation moment to the first shutter member 110. Thus, the first shutter member 110 can be smoothly and reliably operated against the sliding resistance of the circular-arc-shaped guide wall portion 118 and the tubular wall 40, even by the coil spring 108 which has a small spring constant.

At this time, the second shutter member 120 as well is rotated in the direction of closing the opening 14 by the urging force of the torsion spring 126. However, the first shutter member and the second shutter member 120 may be rotated while the pressing piece 112B and the pressed piece 120B abut one another, or may be rotated while the pressing piece 112B and the pressed piece 120B are apart from each other. In either case, the pressing piece 112B of the first shutter member 110 which has returned to its initial position engages with the inner edge of the front portion of the shutter guiding hole 62, and further rotation of the first shutter member 110 due to the urging force of the coil spring 108, and further rotation of the second shutter member 120, which abuts the pressing piece 112B at the pressed piece 120B, due to the urging force of the torsion spring 126, are prevented.

As described above, the coil spring 108, which applies urging force in the direction of closing the opening 14 to the first shutter member 110, is provided, and the torsion spring 126, which applies urging force in the direction of closing the opening 14 to the second shutter member 120, is provided. Thus, the first shutter member 110 and the second shutter member 120 are appropriately urged in accordance with their respective moving (rotating) directions, and can move (operate) smoothly at the time of closing the opening 14. Further, the first shutter member 110 and the second shutter member 120 are moved to positions of closing the opening merely by urging forces. Thus, the opening 14 can be reliably closed without the shutter engaging portion 114 being pressed forward and the shutter pull-out portion 116 being buckled as in the conventional art.

Further, the first shutter member 110 and the second shutter member 120 are respectively urged independently. Thus, the coil spring 108 and the torsion spring 126, which each have a moderate spring constant, can be used. Handling of the coil spring 108 and the torsion spring 126 at the time of assembly is facilitated, and the assembly workability also improves. Further, due to the first shutter member 110 and the second shutter member 120 operating smoothly, excessive machining precision and assembly precision are not required of the respective portions of the disc cartridge 10. The machinability and assemblability of the respective parts improve, and costs are low.

Further, because the coil spring 108 and the torsion spring 126 each have a moderate spring constant, the coil spring 108 and the torsion spring 126 do not become large. In other words, the disc cartridge 10 do not become large, and the opening 14 for accessing the disc medium 20 can be made large so as to be able to handle large-sized recording/playback heads (e.g., laser heads).

In this way, in the disc cartridge 10 relating to the present invention, the first shutter member 110 and the second shutter member 120 can operate smoothly, and the opening 14 for accessing the disc medium 20 accommodated in the interior can be closed reliably. Note that it is preferable that, at the first shutter member 110 at this time, the shutter main body 112 (including the pressing piece 112B) and the circular-arc-shaped guide wall portion 118 are formed integrally by resin molding. A material which has a low coefficient of friction, such as POM or the like, and which has good friction resistance, is most preferably used as the resin material.

Figure 18:
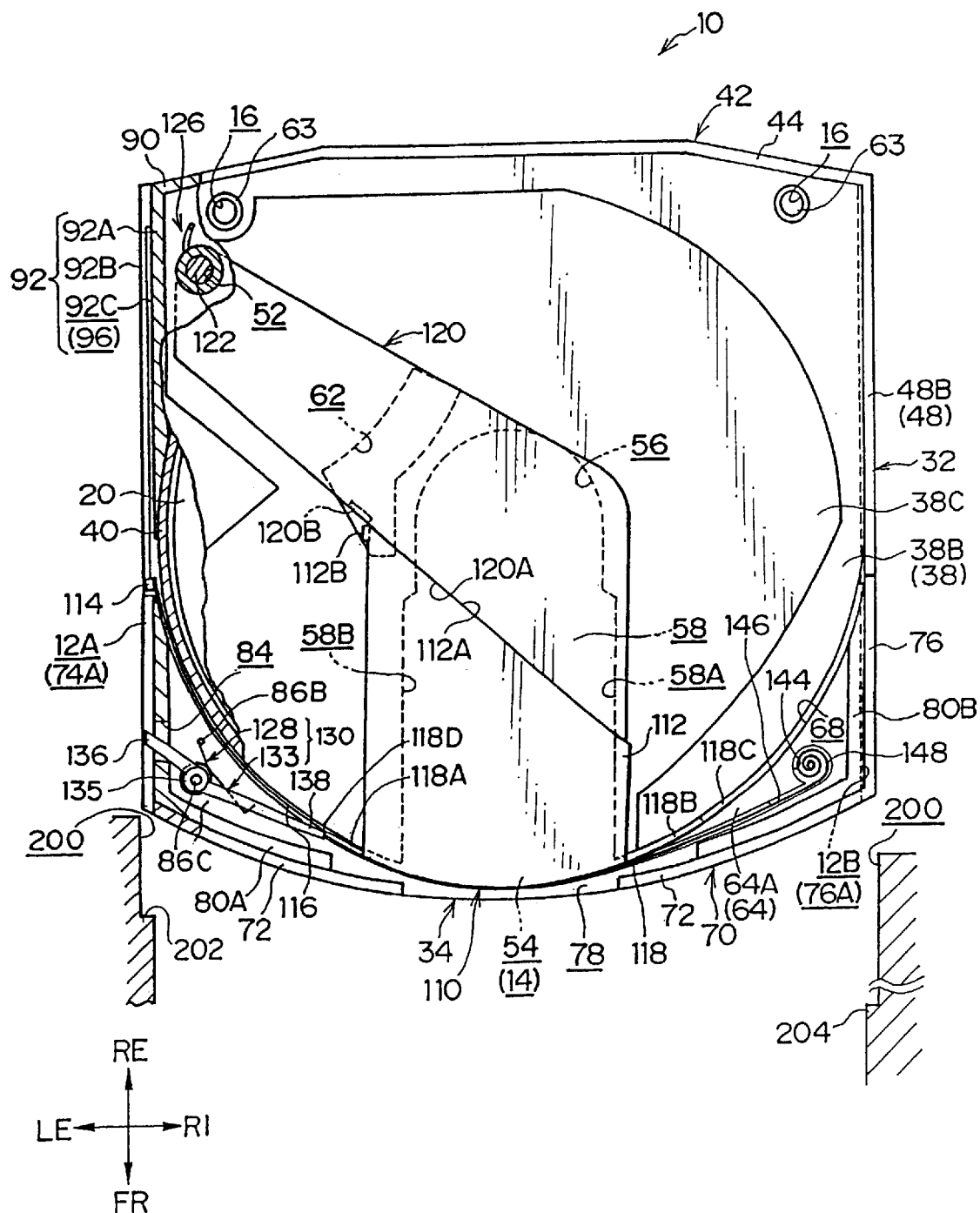
FIG. 18 is a bottom view, in which a bottom surface plate portion is removed and a portion is cut-out, showing the entire structure, in a state in which an opening is closed, of a disc cartridge of another embodiment relating to the present invention.

Next, a variant example will be described on the basis of FIG. 18. Note that parts or portions which are basically the same as in FIGS. 11 through 17 are denoted by the same reference numerals, and description thereof is omitted. In FIG. 18, the disc cartridge 10 relating to a variant example of the above-described embodiment is shown in a bottom view (a bottom view in which the bottom surface plate portion 36 is removed) corresponding to FIG. 14. The disc cartridge 10 differs from that described above in that, instead of the coil spring 108, a spiral spring (power spring) 148 is provided.

In the disc cartridge 10, a spiral spring chamber 144, which is substantially circular as seen in plan view and which is concave, is formed at the front right corner portion (between the annular groove 68 and the inner wall 80B) of the bottom surface 64A of the flat plate portion 64 of the top surface plate portion 34. The spiral spring chamber 144 has substantiality the same depth as that of the annular groove 68, and communicates with the annular groove 68 by a spiral spring groove 146 which extends in a direction substantially tangent to the annular groove 68.

A spiral spring 148 is disposed in the spiral spring chamber 144. One end portion of the spiral spring 148, which one end portion is positioned at the inner side thereof, is anchored at the spiral spring chamber 144. The other end portion, which is positioned at the outer side, passes through the spiral spring groove 146 and is connected (e.g., spot welded) to the jutting-out portion 118B of the circular-arc-shaped guide wall portion 118. The transverse dimension, in the heightwise direction, of the spiral spring 148 corresponds to the depthwise dimension of the annular groove 68. Even at times when the window portion 118C moves to a position corresponding to the window portion 78 of the top surface plate portion 34 as the first shutter member 110 rotates, the spiral spring 148 is not exposed to the exterior.

The spring receiving hook 49, the coil spring path 81, and the coil spring chamber 97 are not provided in this disc cartridge 10. Accordingly, the second guide groove 12B is not provided along substantially the entire front-back direction length. Further, the spring receiving hook 119 is not provided at the first shutter member 110, and the structure is simple.

With such a structure as well, the first shutter member 110 and the second shutter member 120 can respectively be moved (operated) smoothly, without the shutter pull-out portion 116 being buckled at the time when the opening 14 is closed. Further, the spiral spring 148 and the torsion spring 126 can be made to have moderate dimensions having moderate spring constants. Thus, the assemblability improves, the disc cartridge 10 does not become large-sized, and the opening 14 can be made large.

The spiral spring 148 urges the first shutter member 110 from a tangential direction of the annular groove 68. Thus, with a simple structure, urging force along the peripheral direction of the tubular wall 40 can be suitably applied to the first shutter member which is not equipped with a rotation shaft. Further, the maximum rotation moment can be applied to the first shutter member 110. Note that, in the above-described variant example, the spiral spring 148 is disposed at the front right corner portion of the flat plate portion 64 of the top surface plate portion 34. However, the present invention is not limited to the same, and, for example, the spiral spring 148 may be disposed at the rear right corner portion of the base plate portion 32.

Further, the spiral spring 148 is not limited to a structure which expands and contracts (moves) within the spiral spring groove 146 and the annular groove 68. For example, the configuration may be shape-memorized movably along the tubular wall 40, and the spiral spring 148 may be disposed along the outer peripheral portion of the tubular wall 40 beneath the annular groove 68. In this case, if one portion of the spiral spring 148 is formed to also serve as the circular-arc-shaped guide wall portion 118, the number of parts can be reduced, which is even more preferable.

The above is a preferable structure in which the first shutter member 110 is urged by the coil spring 108 or the spiral spring 148 which is connected to the circular-arc-shaped guide wall portion 118. However, the present invention is not limited to the same. For example, a structure in which the first shutter member 110 or the like is urged by the coil spring 108 or the like which is connected to the shutter main body 112 suffices. In this case, it is of course possible for the first shutter member 110 to not include the circular-arc-shaped guide wall portion 118.

Figure 19A:
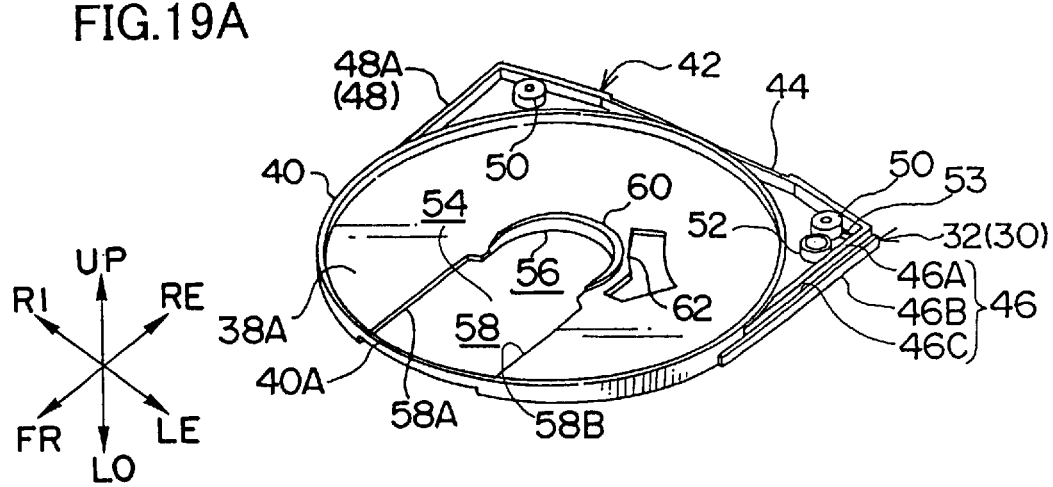
FIGS. 19A and 19B are perspective views showing a base plate portion of the disc cartridge relating to the present invention.
Figure 19B:
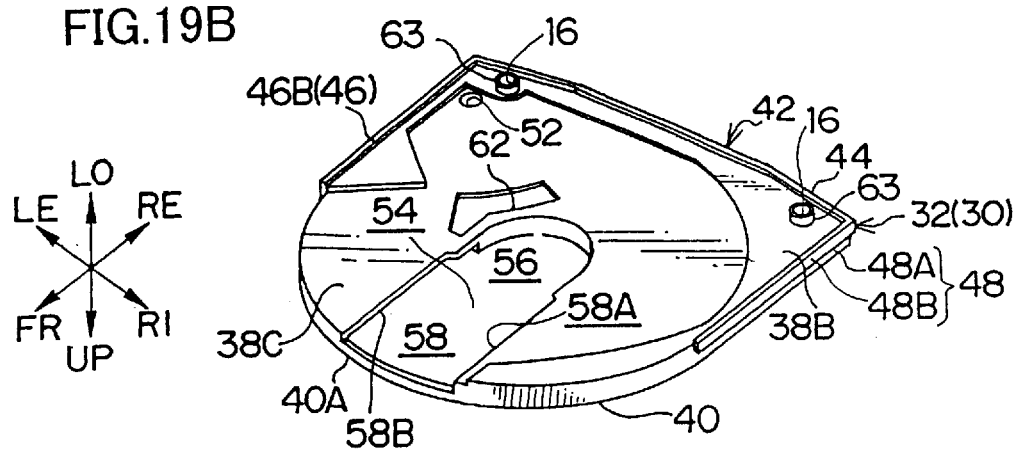

Next, a disc cartridge 10, in which the flatness of the base plate portion 32 is ensured in order to not deteriorate the rotatability (movability) of the first shutter member 110 and the second shutter member 120, will be described on the basis of FIGS. 19 and 20. Note that portions which are the same as those of the previously-described embodiments are denoted by the same reference numerals, and description thereof is omitted. As shown in FIG. 1, the opening 14, which is formed by being cut-out in a substantial U shape, as seen in plan view, from the central portion of the bottom surface of the disc cartridge 10 to the left-right direction central portion of the front wall portion of the front end portion 10A, is provided in the disc cartridge 10, and is for accessing the disc medium 20.

Namely, the opening 54, which forms the opening 14, is formed in the base plate portion 32. As shown in FIG. 19, the opening 54 is formed by the circular hub hole 56 and the window portion 58 for a recording/playback head being connected together. The hub hole 56 has a larger diameter than the outer diameter of the center core portion 26 of the disc medium 20. The window portion 58 for a recording/playback head extends to the outer peripheral front end portion of the base plate portion 32 symmetrically to the left and right along the radial direction of the semicircular portion of the base plate portion 32, and is open in a substantially rectangular shape with the top end portion of the tubular wall 40 remaining. The opening 54 has a configuration which is cut-out in a substantial U shape as seen in plan view.

In this way, at the base plate portion 32, the window portion 58 for a recording/playback head is open with the top end portion of the tubular wall 40 remaining. In other words, at the top end portion of the tubular wall 40 at the peripheral edge of the window portion 58 for a recording/playback head which is open in a substantially rectangular shape, a connecting member 40A, which runs along the configuration of the tubular wall 40, is provided integrally so as to span across, and the top end portion is connected integrally by the connecting member 40A. Thus, the flatness of the peripheral edge portion opposing the window portion 58 for a recording/playback head is ensured, and drawbacks, such as twisting or the like occurring at this portion, do not occur.

The annular groove 68 in this case is formed such that the entire annular wall 40, including the connecting member 40A, can be inserted therein. The connecting member 40A is formed to a height that does not block the window portions 78, 118C as seen in front view. Thus, the drawback of interfering with the recording/playback head which is inserted from the window portions 78, 118C does not occur.

Namely, the height of the connecting member 40A is less than or equal to the height between a top edge portion 78A of the window portion 78 shown in FIG. 3 and the bottom surface 64A of the flat plate portion 64. Similarly, the height of the connecting member 40A is less than or equal to the length between a top edge portion 118E of the window portion 118C and a top edge portion 118F of the jutting-out portion 118B. Thus, when the disc cartridge 10 is loaded into the drive device and recording/playback is carried out, the bottom end surface of the connecting member 40A is usually positioned higher than the recording surface (the bottom surface 24) of the disc medium 20. Thus, the insertion and approach of the recording/playback head is not affected.

In any case, the top end portion of the tubular wall 40, which is the peripheral edge portion of the most distal end of the window portion 58 for a recording/playback head of the base plate portion 32, is connected integrally at the connecting member 40A. Thus, the flatness of the base plate portion 32 can be suitably ensured, and drawbacks such as flexure or twisting due to strain or the like at the time of injection molding can be eliminated. Accordingly, drawbacks, such as the rotatability of the first shutter member 110 and the second shutter member 120 deteriorating, do not arise, rotation of the first shutter member 110 and the second shutter member 120 can be carried out well, and the opening 14 can be suitably opened. Then, even if the window portions 78C, 118C, which form a part of the opening 14 are open, the connecting member 40A of the tubular wall 40 does not obstruct the opening.

Figure 20:
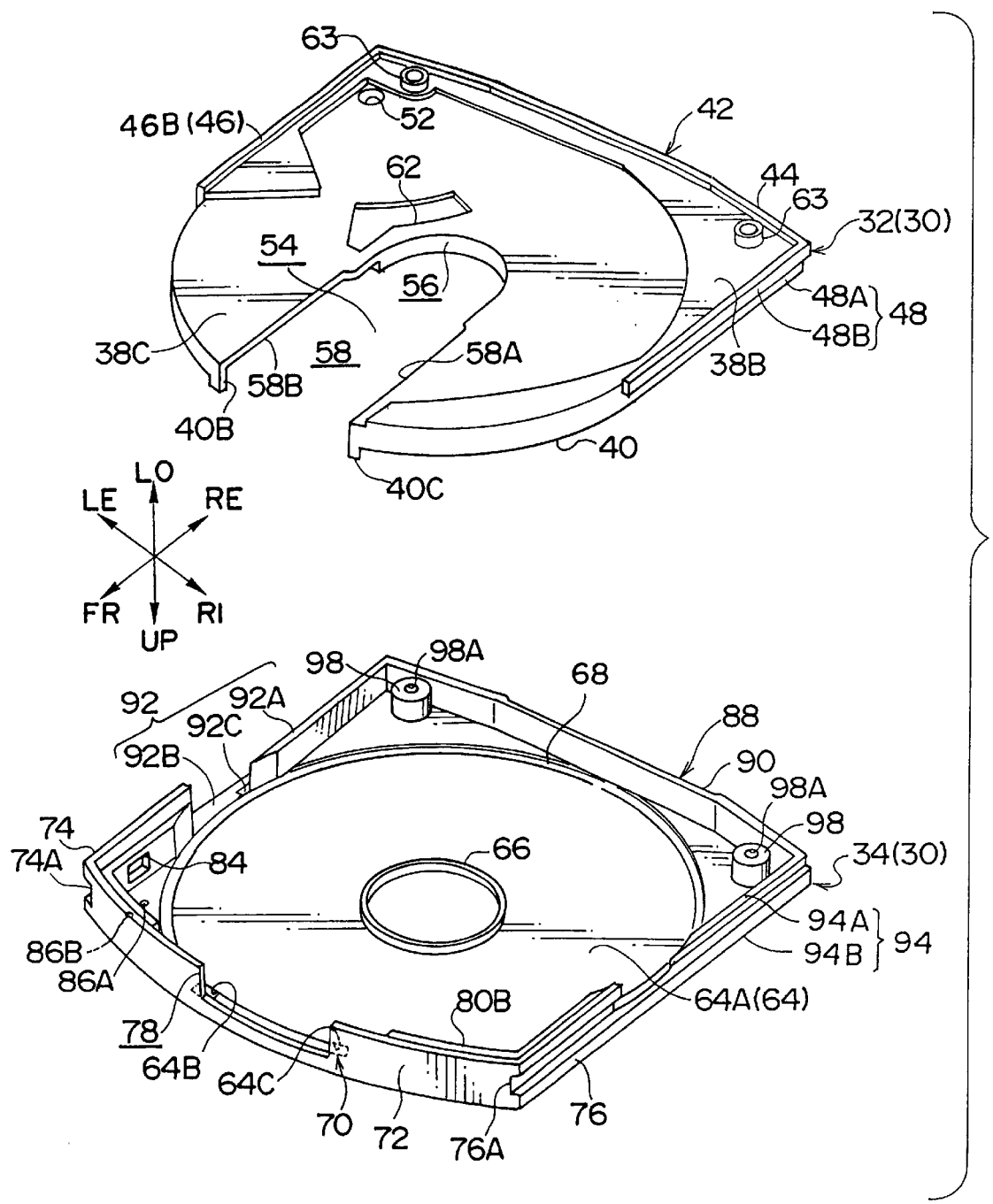
FIG. 20 is a perspective view showing a base plate portion and a top surface plate portion of a disc cartridge of another embodiment relating to the present invention.

Further, it is possible to not provide the connecting member 40A to span across, and to employ a structure such as that shown in FIG. 20. Namely, at the opposing top end portions of the tubular wall 40 which are the peripheral edge portion of the most distal end of the window portion 58 for a playback/recording head of the base plate portion 32, projections 40B, 40C, which are respectively a cylindrical column shape or a square column shape or the like, are provided. Engagement holes 64B, 64C, which cannot be passed through, are provided at predetermined positions within the annular groove 68 which is provided at the bottom surface 64A of the flat plate portion 64, i.e., positions which the projections 40B, 40C abut when the base plate portion 32 and the top surface plate portion 34 are assembled. The sizes of the engagement holes 64B, 64C are set to be slightly smaller than the sizes of the projections 40B, 40C.

In accordance with such a structure, when the disc cartridge 10 is assembled, the projections 40B, 40C are fit (press-fit) into the respective engagement holes 64B, 64C. Thus, the upper end portion of the tubular wall 40 of the base plate portion 32 is fixed to the bottom surface 64A of the top surface plate portion 34. Namely, the top surface plate portion 34 is both strong and balanced, and thus has excellent flatness. Accordingly, by fixing the base plate portion 32 to the top surface plate portion 34, in the same way as the structure shown in FIG. 19, the flatness of the base plate portion 32 can be ensured, and drawbacks such as flexure or twisting due to strain or the like at the time of injection molding can be eliminated.

Accordingly, drawbacks, such as the rotatability of the first shutter member 110 and the second shutter member 120 deteriorating, do not arise, and the opening 14 can be opened suitably. Note that, in a case in which the base plate portion 32 is fixed to the top surface plate portion 34, it is preferable to fix the entire top surface of the tubular wall 40 within the annular groove 68. However, if at least the portions where flexural deformation concentrates, i.e., the peripheral edge portions of the distal end of the window portion 58 for a recording/playback head which is cut-out in a substantially rectangular shape, are fixed, almost all of the effects due to the flexural deformation of the base plate portion 32 can be eliminated.

When fixing is carried out by the fitting together of the projections 40B, 40C and the engagement holes 64B, 64C, the molding processing is made more convenient, and costs are not required. However, the means for fixing the base plate portion 32 to the top surface plate portion 34 are not limited to this, and an arbitrary fixing means may be employed. For example, without providing the projections 40B, 40C and the engagement holes 64B, 64C, the top surface of the tubular wall 40 can merely be fixed within the annular groove 68 of the bottom surface 64A by an adhesive or the like. Or, fixing by ultrasonic welding or the like may be carried out, or fixing by fastening by screws or the like may be carried out. In the case of ultrasonic welding, it is preferable that small projections or the like for ultrasonic welding are provided at the top end portion of the tubular wall 40.

Lastly, a disc cartridge 10, in which loading into a drive device can be carried out smoothly and stably, will be described on the basis of FIGS. 21 through 26. Portions which are the same as those of the previously-described embodiments are denoted by the same reference numerals, and description thereof is omitted. A push portion 150, against which fingers of the user push at the time of loading into a drive device, is formed in the center of the rear end portion 10B of the disc cartridge 10. This push portion 150 is formed in, for example, a configuration which is concave in a substantially circular-arc shape as seen in plan view, so that fingers can easily be pushed thereagainst. In this way, loading of the disc cartridge 10 into the drive device can be carried out smoothly.

Namely, a concave portion 150A, which is substantially circular-arc-shaped as seen in plan view and which forms the push portion 150, is formed in the center of the rear wall 44 of the base plate portion 32. A concave portion 150B, which is substantially circular-arc-shaped as seen in plan view and which forms the push portion 150, is formed in the center of the rear wall 90 of the top surface plate portion 34. A concave portion 150C, which is substantially circular-arc-shaped as seen in plan view and which forms the push portion 150, is formed in the center of the rear portion of the bottom surface plate portion 36. Accordingly, when the disc cartridge 10 is inserted while the push portion 150 provided in the center of the rear end portion 10B is pushed by fingers, the pushing force applied to the disc cartridge 10 is applied parallel to the loading direction (the insertion direction) of the drive device, and the disc cartridge 10 can be inserted smoothly.

In this way, at the time of loading the disc cartridge 10 into a drive device, by pushing the push portion 150, the disc cartridge 10 can be loaded while force is applied parallel to the loading direction. Accordingly, the drawback of the disc cartridge 10 being difficult to load into the drive device is mitigated, and the disc cartridge 10 can be loaded smoothly and stably. Note that the push portion 150 is preferably a configuration which can be easily identified by the user. In addition to the configuration shown in FIG. 21, those shown in FIGS. 22 through 26 also suffice.

Figure 22:
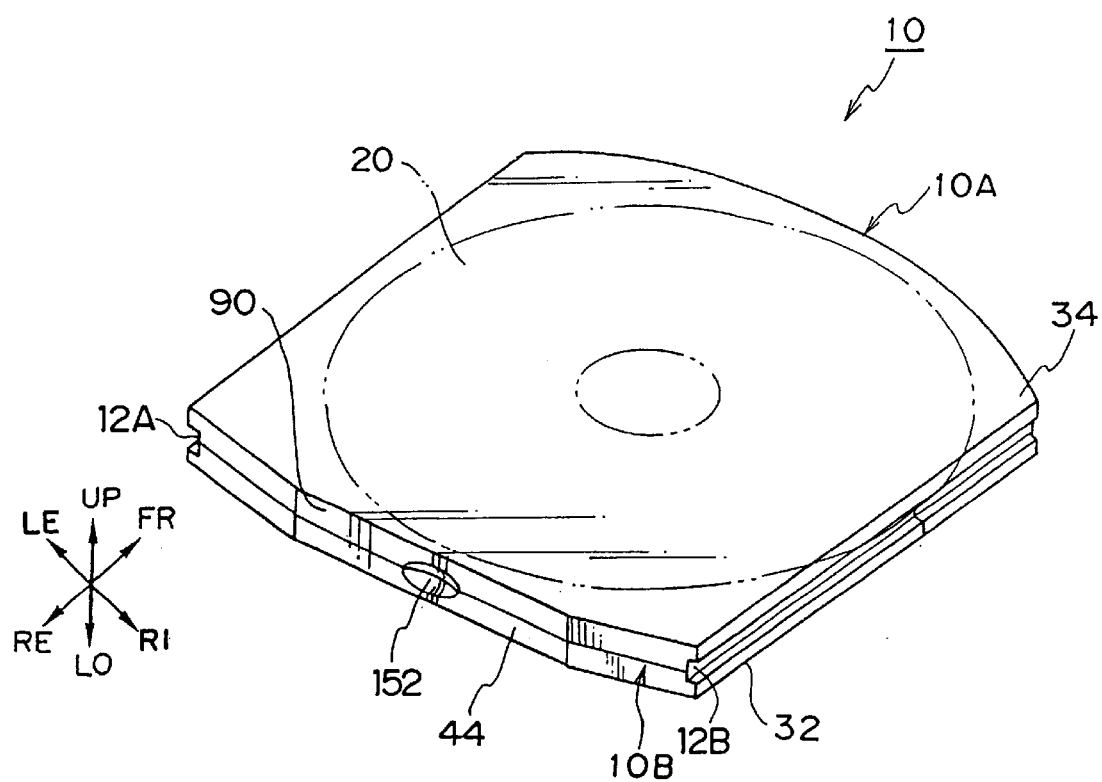
FIG. 22 is a perspective view, as seen from the rear and above at an angle, of a disc cartridge of another embodiment relating to the present invention.
Figure 23:
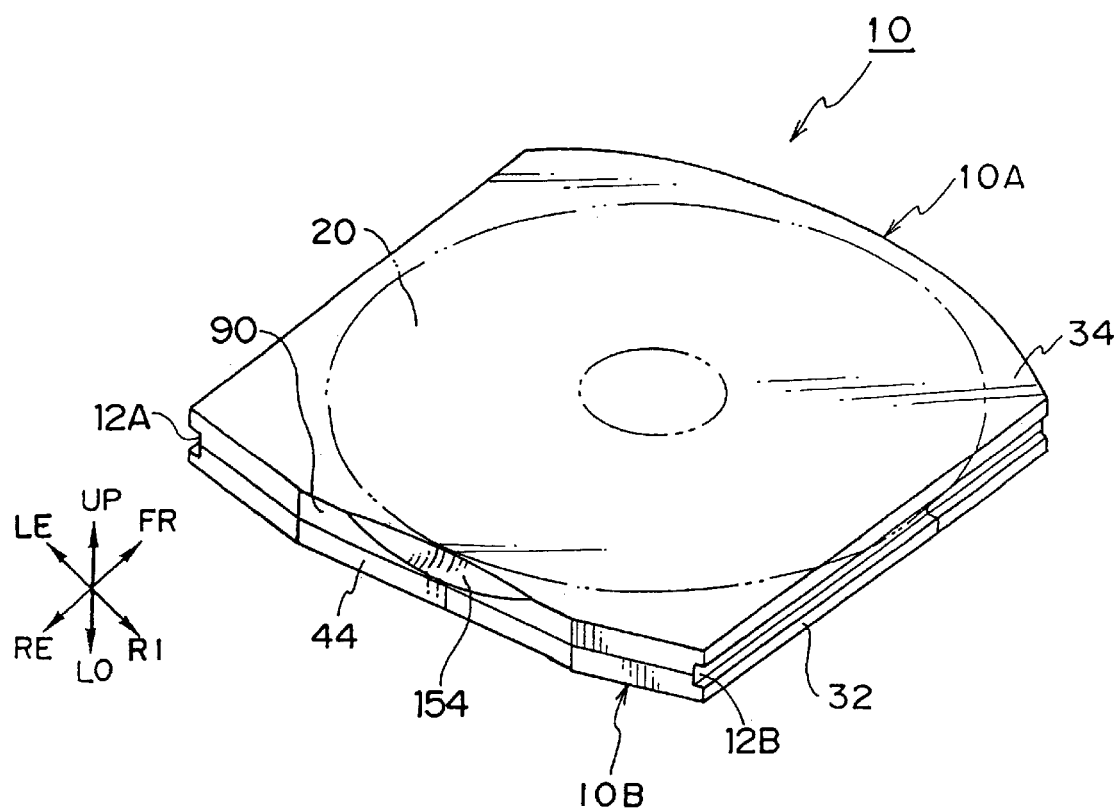
FIG. 23 is a perspective view, as seen from the rear and above at an angle, of a disc cartridge of another embodiment relating to the present invention.

Namely, as shown in FIG. 22, a push portion 152, which is of a curved concave configuration which is substantially oval as seen in rear view, may be provided at the center of the region of abutment of the rear wall 90 of the top surface plate portion 34 and the rear wall 44 of the base plate portion 32 which form the rear end portion 10B of the disc cartridge 10. Or, as shown in FIG. 23, a push portion 154, which is of a curved concave configuration which is substantially oval as seen in rear view, may be provided from the substantial center of the rear wall 90 of the top surface plate portion 34 to the flat plate portion 64. Note that, although not illustrated, a push portion which is the same as the push portion 154 may be provided from the substantial center of the rear wall 44 of the base plate portion 32 to the bottom surface plate portion 36. In this case, it is also possible for the push portion to be provided at both the top and bottom sides, rather than at either of the top and bottom sides. Due to these push portions 152, 154, the user can easily know the optimal push point of the disc cartridge 10, which is preferable.

Figure 24:
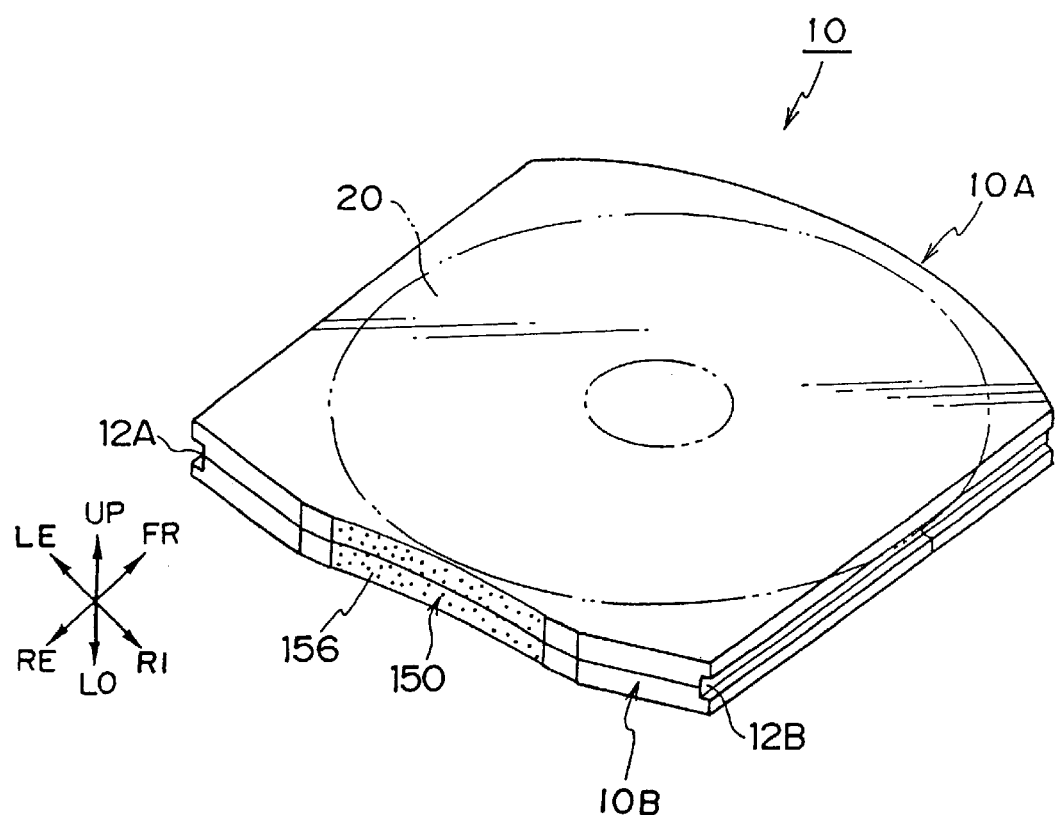
FIG. 24 is a perspective view, as seen from the rear and above at an angle, of a disc cartridge of another embodiment relating to the present invention.

Further, it is preferable for at least the surface, which is contacted by the fingers, of the push portions 150, 152, 154, to be subjected to a surface roughening treatment, e.g., a striping processing or a satin finish processing or the like. Namely, as shown in FIG. 24 for example, it is preferable to provide a large number of small projections 156 or the like at the surface of the push portion 150. When such a surface roughening treatment is carried out, it aims to stop slippage of the fingers at the time of loading the disc cartridge 10, and the loading into the drive device can be carried out more stably.

Figure 25:
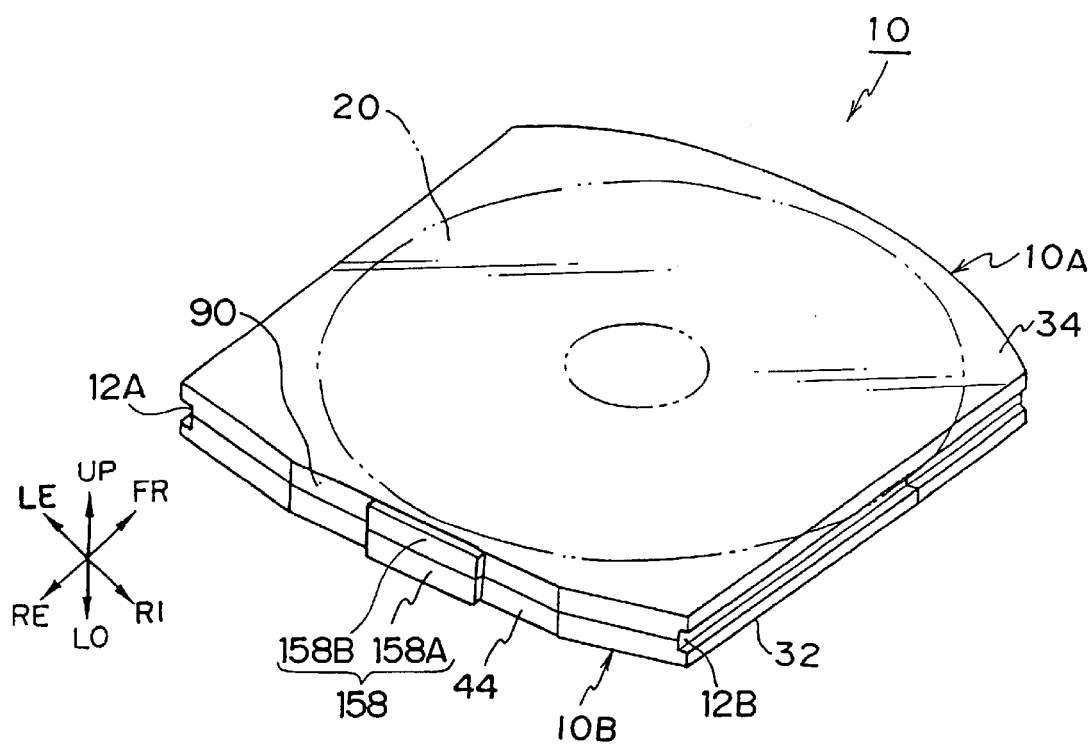
FIG. 25 is a perspective view, as seen from the rear and above at an angle, of a disc cartridge of another embodiment relating to the present invention.
Figure 26:
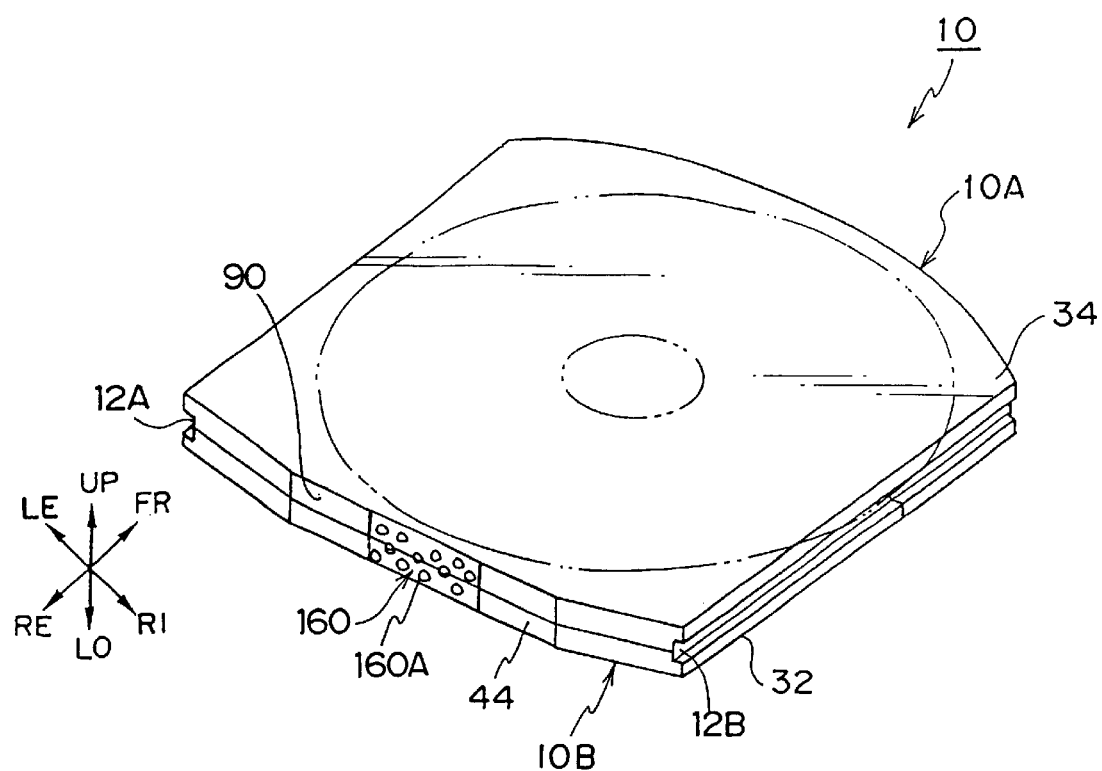
FIG. 26 is a perspective view, as seen from the rear and above at an angle, of a disc cartridge of another embodiment relating to the present invention.
Figure 27:
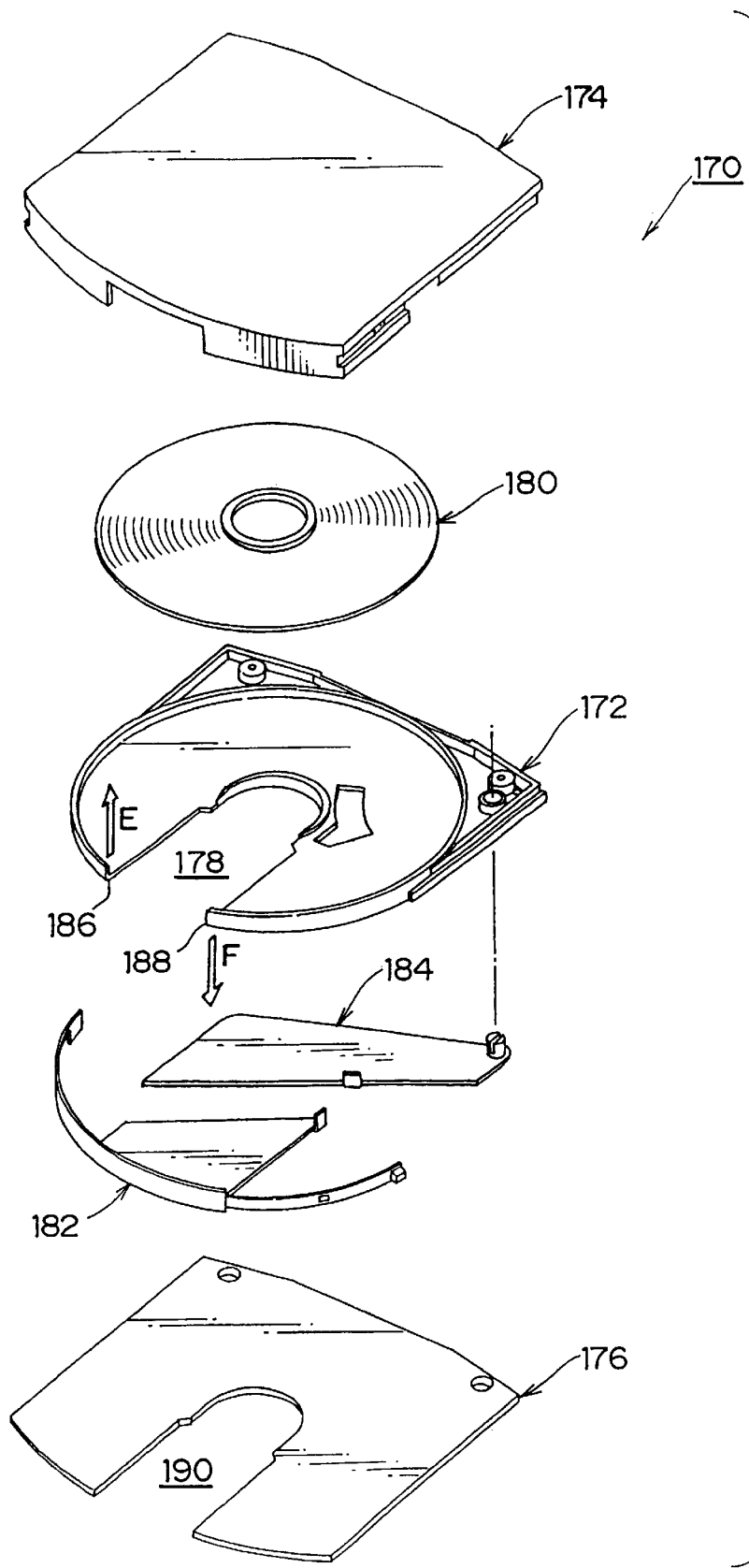
FIG. 27 is an exploded perspective view, as seen from above at an angle, of a conventional disc cartridge.

In any case, it suffices for the push portion relating to the present invention to be such that force is applied to the disc cartridge 10 parallel to the loading direction, when the disc cartridge 10 is loaded into a drive device. If the push portion 150, which is provided at the entire center of the rear surface of the disc cartridge 10, or the push portion 154, which is provided at least from the substantial center of the rear wall 90 of the top surface plate portion 34 to the flat plate portion 64, is provided, the disc cartridge 10 can be stably loaded into the drive device. Further, the push portion of course does not have to be recessed. As shown in FIG. 25, a push portion 158 may be formed by providing convex portions 158A, 158B at the rear walls 44, 90, respectively. Or, as shown in FIG. 26, a push portion 160 may be formed by providing a plurality of small projections 160A on flat surfaces of the rear walls 44, 90.

In any case, in each of the above-described embodiments, the disc medium 20 is a single-side recording type, and the opening 14 is provided at the bottom side (including the front side). However, the present invention is not limited to the same. For example, the disc medium 20 may be a both-sides recording type in which the opening 14 is provided at the top side as well, and shutter members which open and close the top and bottom openings may be respectively provided. Further, the opening 14 is not limited to the structure in which the hub hole 56 and the window portion 58 for a recording/playback head are connected, and the hub hole 56 and the window portion 58 for a recording/playback head may of course be formed separately. Moreover, the disc medium 20 is not limited to a structure having the center core portion 26, and the disc medium 20 may be structured to be held at the center hole 22 by a rotation spindle shaft.

In accordance with the present invention, the recorded/unrecorded regions of the disc medium can be easily confirmed visually from the exterior, and deteriorating effects due to ultraviolet light on the recording surface of the disc medium can be prevented. Further, drawbacks such as the rotatability of the shutter members deteriorating do not arise, and the shutter members can be operated smoothly. Thus, dust arising due to the shutter members can be prevented, and the occurrence of errors at the time of recording and playback due to dust or the like can be reduced. Moreover, the opening for accessing the disc medium can be reliably opened and closed. In addition, at the time of loading the disc cartridge into a drive device, the disc cartridge can be loaded by applying force parallel to the loading direction. Thus, the disc cartridge can be smoothly and stably loaded.

What is claimed is:

1. A disc cartridge having:

a case which is formed by joining a top shell and a bottom shell, and which rotatably accommodates a disc-shaped disc medium which can be recorded on at least one time and at which recorded/unrecorded regions can be visually identified;

an opening, provided in the case, for access to the disc medium;

a shutter portion which is provided at an outer side of the case and at a disc medium recording surface side of the case, and which opens and closes the opening; and a covering plate portion in which an opening for access to the disc medium is formed, the shutter portion being movably accommodated between the covering plate portion and the case, wherein a transparent window portion, which enables visual recognition of the recorded/unrecorded regions of the disc medium, is provided respectively at a region of the covering plate portion which region is other than a region where the shutter portion is disposed when the opening is closed, and in a portion of at least one of the top shell and the bottom shell which portion corresponds to the region of the covering plate portion at which the transparent window is provided, the transparent window having a surface area which is less than a surface area of a full side of the disk medium.

2. A disc cartridge according to claim 1, wherein each window portion is formed substantially radially in substantial correspondence with a length from an inner periphery to an outer periphery at a recording surface of the disc medium.

3. A disc cartridge according to claim 1, wherein a scale, which enables recognition of a capacity of one of a recorded region and an unrecorded region of the disc medium, is provided at one of the transparent window portions.

4. A disc cartridge according to claim 1, wherein at least one of the transparent window portions is formed of a material which attenuates transmission of neighboring wavelengths including a recording wavelength of the disc medium.

5. A disc cartridge according to claim 1, wherein a substance, which attenuates transmission of neighboring wavelengths including a recording wavelength of the disc medium, is applied on at least one of surfaces of the transparent window portions.

6. A disc cartridge according to claim 1, wherein a substance, which attenuates transmission of neighboring wavelengths including a recording wavelength of the disc medium, is kneaded into at least one of the transparent window portions.

7. A disc cartridge according to claim 1, wherein the transparent window includes tick marks which are distributed radially from a center of the disk medium and correspond to an amount of recording space on the disk medium.

8. A disk cartridge of claim 1, wherein the transparent window portion of the at least one of the top shell and bottom shell is provided in the bottom shell, and the bottom shell is disposed between the disk medium and the shutter.

* * * * *